(12) United States Patent  
Moribe et al.

(10) Patent No.: US 11,003,965 B2
(45) Date of Patent: May 11, 2021

(54) IMAGE PROCESSING METHOD

(71) Applicant: CANON KABUSHIKI KAISHA, Tokyo (JP)

(72) Inventors: Shoei Moribe, Kawasaki (JP); Yumi Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/843,304

(22) Filed: Apr. 8, 2020

(65) Prior Publication Data

US 2020/0327385 A1 Oct. 15, 2020

(30) Foreign Application Priority Data

Apr. 15, 2019 (JP) .............................. JP2019-077338

(51) Int. Cl.
G06K 15/10 (2006.01)
B41J 2/21 (2006.01)
G06K 15/00 (2006.01)

(52) U.S. Cl.
CPC ............. *G06K 15/102* (2013.01); *B41J 2/211* (2013.01); *G06K 15/407* (2013.01)

(58) Field of Classification Search
CPC ...... G06K 15/102; G06K 15/407; B41J 2/211
See application file for complete search history.

(56) References Cited

U.S. PATENT DOCUMENTS

| 6,867,884 B1 | 3/2005 | Rozzi |
| 9,592,689 B2 | 3/2017 | Yanai |
| 9,623,670 B2 | 4/2017 | Kagawa |
| 9,636,937 B2 | 5/2017 | Ikeda |
| 9,649,839 B2 | 5/2017 | Ishikawa |
| 9,661,181 B2 | 5/2017 | Kato |
| 9,704,074 B2 | 7/2017 | Kato |
| 9,715,636 B2 | 7/2017 | Ikeda |
| 9,815,275 B2 | 11/2017 | Yanai |
| 9,965,842 B2 | 5/2018 | Suwa |

(Continued)

FOREIGN PATENT DOCUMENTS

| JP | 2016-112892 | 6/2016 |
| JP | 2017-38127 | 2/2017 |

OTHER PUBLICATIONS

U.S. Appl. No. 16/843,412, filed Apr. 8, 2020 by Shoei Moribe et al.

(Continued)

*Primary Examiner* — Christopher Wait
(74) *Attorney, Agent, or Firm* — Venable LLP

(57) ABSTRACT

An image is printed by using a first, second and third ink. A surface tension difference between a first ink and a third ink is smaller than a surface tension difference between the first ink and a second ink. A first gradation value for the first ink, a second gradation value for the second ink and a third gradation value for the third ink are quantized to generate a first quantized value, a second quantized value, and a third quantized value respectively. This quantization processing is performed such that, the number of pixels for each of which the first quantized value indicates printing, a the second quantized value indicates non-printing and the third quantized value indicates non-printing is greater than the number of pixels for each of which the first quantized value indicates printing and at least the second quantized value indicates printing or the third quantized value indicates printing.

25 Claims, 14 Drawing Sheets

(56) References Cited

U.S. PATENT DOCUMENTS

| | | |
|---|---|---|
| 10,013,626 B2 | 7/2018 | Hori |
| 10,165,153 B2 | 12/2018 | Kajiwara |
| 10,462,333 B2 | 10/2019 | Kajiwara |
| 10,546,191 B2 | 1/2020 | Tanaka |
| 2016/0167414 A1 | 6/2016 | Yanai |
| 2017/0120577 A1 | 5/2017 | Yanai |
| 2020/0042840 A1 | 2/2020 | Doi |
| 2020/0045208 A1 | 2/2020 | Doi |

OTHER PUBLICATIONS

U.S. Appl. No. 16/843,151, filed Apr. 8, 2020 by Shoei Moribe et al.

IMAGE PROCESSING METHOD

BACKGROUND OF THE INVENTION

Field of the Invention

The present invention relates to an image processing method for printing an image on a print medium by performing quantization processing.

Description of the Related Art

A pigment ink and a dye ink are known as inks used in an inkjet printing apparatus. The pigment ink has higher light resistance and water resistance than the dye ink. Moreover, the pigment ink has relatively high surface tension and a penetration rate thereof into a print medium is low. Accordingly, the pigment ink tends to remain on a surface of a print medium and an excellent coloring property can be obtained. Meanwhile, since the pigment ink tends to remain on a surface of a print medium, the pigment ink also has a characteristic of poor rub-fastness.

Japanese Patent Laid-Open No. 2016-112892 discloses a quantization processing method for improving the rub-fastness of an image in an inkjet printing apparatus using a pigment ink (first color) and a dye ink (second color). According to Japanese Patent Laid-Open No. 2016-112892, quantization processing for the first color is performed by comparing a gradation value of the first color with a threshold stored in a threshold matrix and quantization processing for the second color is performed by comparing a gradation value of the second color with a value obtained by offsetting the threshold based on the gradation value of the first color. In this specification, such quantization processing is hereafter referred to as inter-color processing.

In the case where the inter-color processing is used, a region of highlight to an intermediate gray scale level can be printed with dots of inks of multiple colors arranged with minimum possible overlapping on the printing medium. Moreover, in the case where a threshold matrix with blue noise characteristics is used, the dispersiveness of an ink color set as the first color among the multiple ink colors can be made particularly high. In Japanese Patent Laid-Open No. 2016-112892, such characteristics of the inter-color processing are used. Specifically, a pigment ink with high surface tension is set as the first color and a dye ink with low surface tension is set as the second color to suppress a decrease in the rub-fastness which occurs with overlapping of the pigment ink.

Among the inkjet printing apparatuses, there is an apparatus which uses a black pigment ink and a color dye ink in combination to achieve both of high-quality character printing and printing of a color image suppressed in bleed (bleed at a boundary between different colors). However, in the case where such a printing apparatus prints the color ink and the black ink in an overlapping manner, the density of black in an image becomes lower than that in the case where only the black ink is printed and, as a result, the quality of black characters decreases in some cases. This is because, even if the black ink is an ink with high surface tension, penetration of the black ink into the print medium in the depth direction is promoted in the case where the black ink is printed at the same position as the color ink with low surface tension and the color material is less likely to remain on the surface of the print medium.

In this case, using the inter-color processing as in Japanese Patent Laid-Open No. 2016-112892 and setting the black ink with high surface tension as the first color and the color ink with low surface tension as the second ink can lead to printing of the first color and the second color with minimum possible overlapping. However, in the case where additional multiple color inks such as a third color ink and a fourth color ink are used, a situation where the black ink is printed to overlap any of the color inks occurs even if the inter-color processing is employed. Accordingly, there is a concern about a decrease in character printing quality.

Although the example in which the ink with high surface tension is the black ink is described above, the same applies to the case where the ink with high surface tension is a color ink. Specifically, in the case where a color ink with high surface tension is used to output an image with excellent coloring property, the color ink cannot sufficiently exhibit its coloring property if the color ink is printed to overlap another ink with low surface tension.

SUMMARY OF THE INVENTION

The present invention has been made to solve the aforementioned problems. Accordingly, an object of the invention is to output an image with high density and excellent coloring property while avoiding a decrease in density and a deterioration in coloring property of an ink with high surface tension in an inkjet printing apparatus configured to print an image by using multiple inks varying in surface tension.

In a first aspect of the present invention, there is provided an image processing method comprising: an obtaining step of obtaining a first gradation value for a first coloring material, a second gradation value for a second coloring material, and a third gradation value for a third coloring material for each pixel; and a generation step of, for each pixel, generating a first quantized value indicating applying or non-applying of the first coloring material by quantizing the first gradation value, generating a second quantized value indicating applying or non-applying of the second coloring material by quantizing the second gradation value, and generating a third quantized value indicating applying or non-applying of the third coloring material by quantizing the third gradation value, the image processing method including performing image processing for printing an image on a print medium by using an applying unit configured to apply the first coloring material according to the first quantized value, apply the second coloring material according to the second quantized value, and apply the third coloring material according to the third quantized value, wherein surface tension of the first coloring material is higher than surface tension of the second coloring material and the third coloring material, and wherein in a case where the same first gradation values, the same second gradation values, and the same third gradation values for a plurality of pixels included in a predetermined pixel region are obtained uniformly in the obtaining step, in the generation step, the first quantized values, the second quantized values, and the third quantized values are generated such that, in the predetermined pixel region, the number of pixels for each of which the first quantized value indicates applying the first coloring material, a the second quantized value indicates non-applying the second coloring material and the third quantized value indicates non-applying the third coloring material is greater than the number of pixels for each of which the first quantized value indicates applying the first coloring material and at least the second quantized value indicates applying the second coloring material or the third quantized value indicates applying the third coloring material.

In a second aspect of the present invention, there is provided an image processing method comprising a generation step of generating a first quantized value by quantizing a first gradation value for a first coloring material, generating a second quantized value by quantizing a second gradation value for a second coloring material, and generating a third quantized value by quantizing a third gradation value for a third coloring material, for each pixel, the image processing method including performing image processing for printing an image on a print medium by using an applying unit configured to apply the first coloring material according to the first quantized value, apply the second coloring material according to the second quantized value, and apply the third coloring material according to the third quantized value, wherein surface tension of the first coloring material is higher than surface tension of the second coloring material and the third coloring material, and wherein in the generation step, the first quantized value is generated by comparing the first gradation value with a threshold for the pixel in a threshold matrix, the second quantized value is generated based on the first gradation value, the second gradation value, and the threshold used in the comparison with the first gradation value, and the third quantized value is generated based on the first gradation value, the third gradation value, and the threshold used in the comparison with the first gradation value.

In a third aspect of the present invention, there is provided an image processing method comprising: an obtaining step of obtaining a first gradation value for a first coloring material and a second gradation value for a second coloring material for each pixel; and a generation step of quantizing the first gradation value to generate a first quantized value at any of a certain number of levels that is smaller than the number of levels for the first gradation value and quantizing the second gradation value to generate a second quantized value at any of a certain number of levels that is smaller than the number of levels for the second gradation value, for each pixel, the image processing method including performing image processing for printing an image on a print medium by using an applying unit configured to apply the first coloring material according to the first quantized value such that the higher the level of the first quantized value is, the greater an amount of the first coloring material to be applied is and apply the second coloring material according to the second quantized value such that the higher the level of the second quantized value is, the greater an amount of the second coloring material to be applied is, wherein surface tension of the first coloring material is higher than surface tension of the second coloring material, and wherein in a case where the same first gradation values and the same second gradation values for a plurality of pixels included in a predetermined pixel region are obtained uniformly in the obtaining step, in the generation step, the first quantized values and the second quantized values are generated such that, in the predetermined pixel region, pixels with a lower level of the first quantized values include more pixels for which the level of the second quantized value is not 0.

In a fourth aspect of the present invention, there is provided an image processing method comprising a generation step of quantizing a first gradation value for a first coloring material to generate a first quantized value at any of a certain number of levels that is smaller than the number of levels for the first gradation value and quantizing a second gradation value for a second coloring material to generate a second quantized value at any of a certain number of levels that is smaller than the number of levels for the second gradation value, for each pixel, the image processing method including performing image processing for printing an image on a print medium by using an applying unit configured to apply the first coloring material according to the first quantized value such that the higher the level of the first quantized value is, the greater an amount of the first coloring material to be applied is and apply the second coloring material according to the second quantized value such that the higher the level of the second quantized value is, the greater an amount of the second coloring material to be applied is, wherein surface tension of the first coloring material is higher than surface tension of the second coloring material, and wherein in the generation step, the first gradation value is quantized to generate the first quantized value by deriving a corrected threshold, having a greater value than a threshold for the pixel in a threshold matrix, based on the threshold and comparing the first gradation value with the threshold and the corrected threshold, a first difference which is a difference between the second gradation value and the threshold used in the comparison with the first gradation value is changed based on the first gradation value, a second difference which is a difference between the second gradation value and the corrected threshold used in the comparison with the first gradation value is changed based on the first gradation value, and the second gradation value is quantized based on relationships of the second gradation value with the threshold and the corrected threshold after the change, in a case where the same first gradation values and the same second gradation values are uniformly given to a plurality of pixels included in a predetermined pixel region, in the gradation step, the first difference and the second difference are changed such that, in the predetermined pixel region, pixels with a lower level of the first quantized values include more pixels for which the level of the second quantized value is not 0.

Further features of the present invention will become apparent from the following description of exemplary embodiments with reference to the attached drawings.

BRIEF DESCRIPTION OF THE DRAWINGS

FIG. 10 is a diagram showing the relationship of FIGS. 10A and 10B;

DESCRIPTION OF THE EMBODIMENTS

First Embodiment (Apparatus Configuration)

Figure 1A:
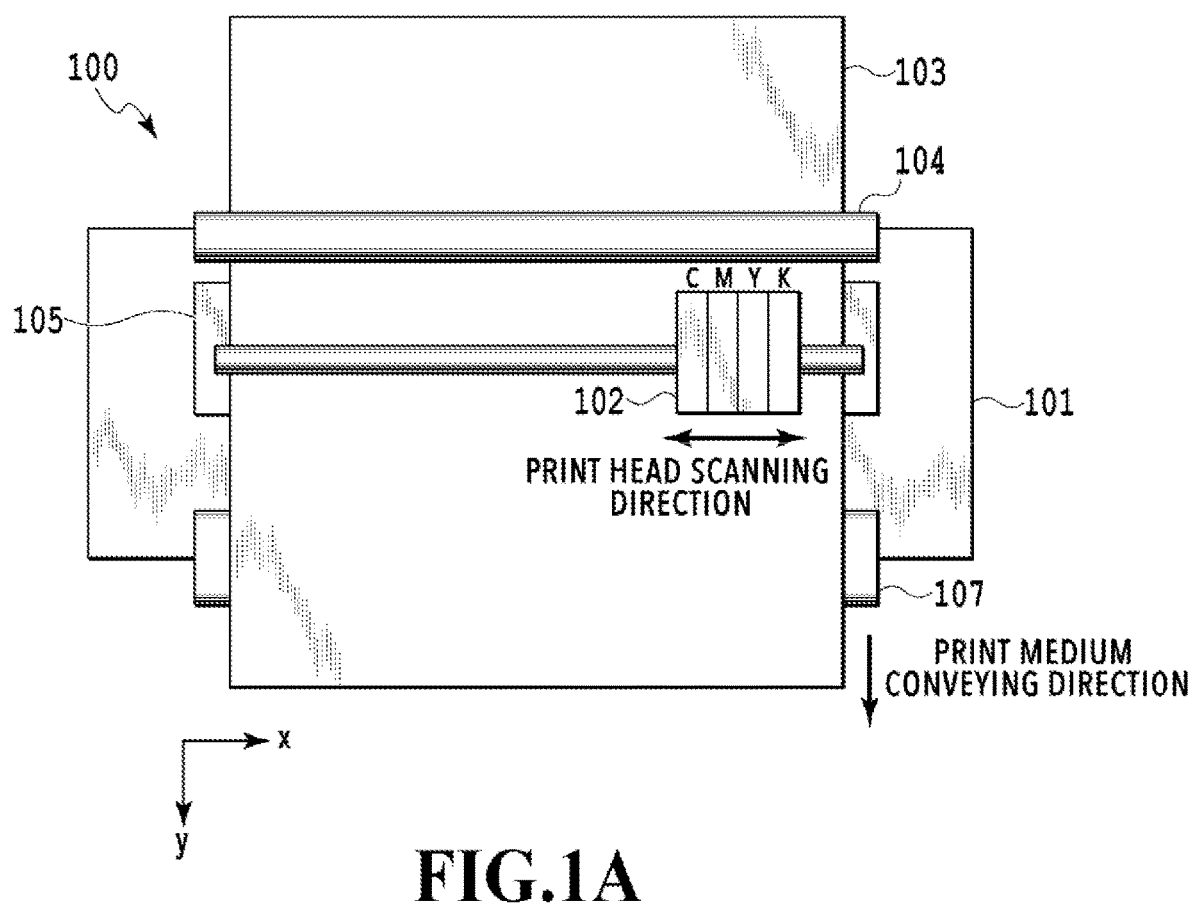
FIGS. 1A and 1B are schematic configuration diagrams of an inkjet printing apparatus and a print head.
Figure 1B:
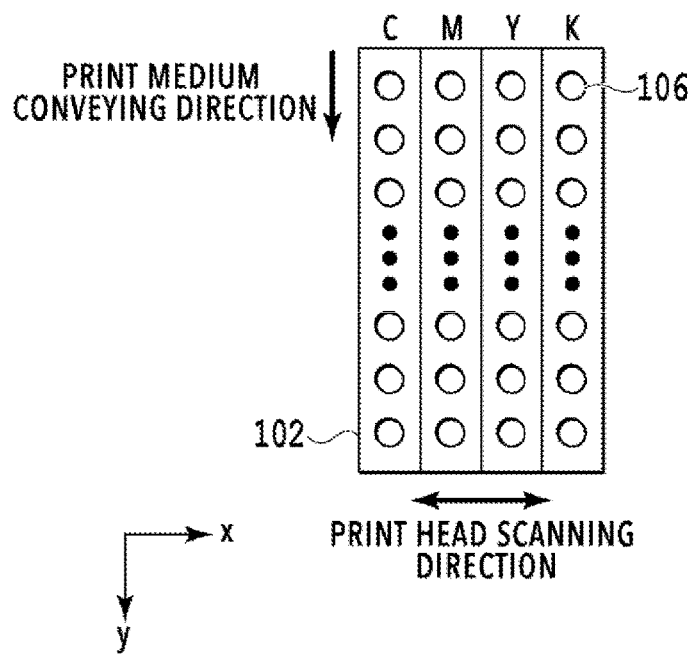

FIGS. 1A and 1B are schematic configuration diagrams of an inkjet printing apparatus 100 (hereafter also simply referred to as printing apparatus 100) usable in the present invention and a print head 102 mountable in the printing apparatus 100. The printing apparatus 100 of the embodiment is a serial inkjet printing apparatus and the print head 102 is capable of reciprocating in an x-direction in FIGS. 1A and 1B.

In the print head 102, nozzle rows which eject inks of cyan (C), magenta (M), yellow (Y), and black (K), respectively, are arranged in the x-direction and, in each nozzle row, nozzles 106 which eject the ink are arranged in a y-direction. In FIGS. 1A and 1B, although the nozzles which eject the ink of the same color are arranged in one row in the y-direction in each nozzle row, the nozzle row of each color may include multiple nozzle rows which eject the ink of the same color. In the embodiment, the ink of black (K) among the inks of four colors of cyan (C), magenta (M), yellow (Y), and black (K) is a pigment ink with relatively high surface tension and the ink of cyan (C), magenta (M), yellow (Y) are dye inks with relatively low surface tension.

Relationships between the inks and dot power are briefly described. In this specification, the dot power can be interpreted as visual obviousness and is based on the lightness of a dot formed by applying the ink on a print medium as a droplet. Specifically, the lower the lightness of the dot of the ink is, the higher the visual obviousness of the dot is, and the higher the dot power thereof is. In contrast, the higher the lightness of the dot of the ink is, the lower the visual obviousness of the dot is, and the lower the dot power thereof is. In the embodiment, dots were formed on a print medium by using inks of four colors to be used and the level of the dot power of each color was checked based on a result obtained by measuring the lightness L* in the CIEL*a*b* color space. As a result, black (K) being an achromatic color had the highest dot power among the four colors to be used. Then, it was checked that the descending order of the dot power of the chromatic colors was cyan (C), magenta (M), and yellow (Y). The dot power of an overlapping dot is higher than the dot power of each of single-color dots formed with colors of the respective inks forming this overlapping dot, but depends on a combination of the overlapping inks. For example, in the embodiment, the dot power of the overlapping dot of cyan and magenta is higher than the dot power of the single-color dot of cyan and the dot power of the single-color dot of magenta but is lower than the dot power of the single-color dot of black.

Returning to the explanation of FIGS. 1A and 1B, a print medium 103 in a region in which the print head 102 performs printing is held between a pair of conveyance rollers 104 and a pair of discharge rollers 107 and is maintained to be flat and smooth. Moreover, a platen 105 is arranged at a position facing an ejection port surface of the print head 102 and supports the print medium 103 subjected to printing from the back side.

In the aforementioned configuration, the print head 102 moves in the x-direction while ejecting the inks according to print data to perform one print scanning operation. In the case where such one print scanning operation is performed, the conveyance rollers 104 and the discharge rollers 107 turn and convey the print medium 103 in the y-direction by a distance corresponding to a print width of the print head 102. Then, such a print scanning operation by the print head 102 and such a conveyance operation of the print medium 103 are alternately repeated and an image is printed on the print medium 103 step by step.

(System Configuration)

Figure 2:
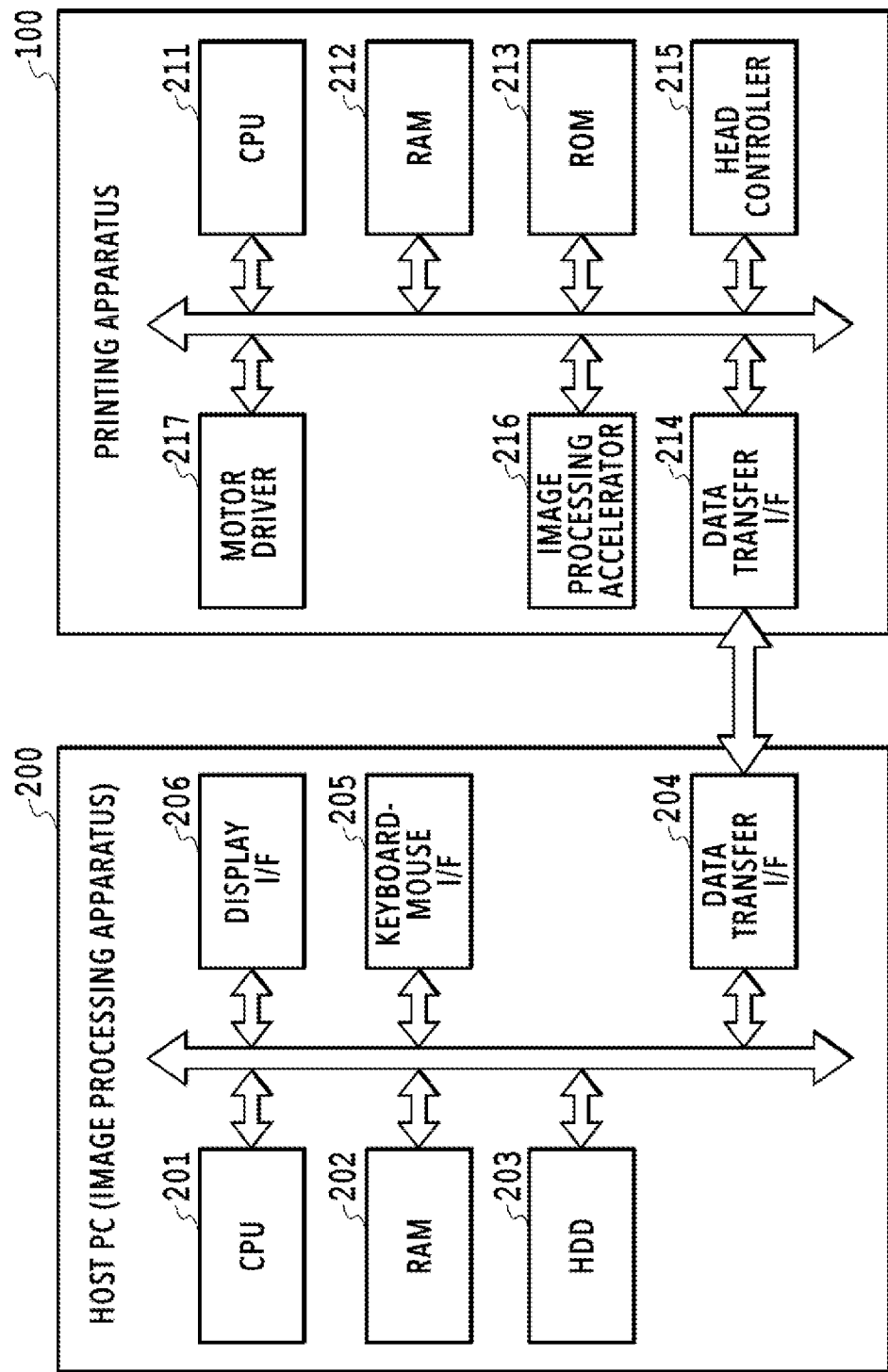
FIG. 2 is a block diagram illustrating a configuration of control of an inkjet printing system.

FIG. 2 is a block diagram illustrating a configuration of control of an inkjet printing system usable in the present invention. The inkjet printing system in the embodiment includes the printing apparatus 100 and an image processing apparatus 200 such as a host PC. Image data subjected to predetermined image processing in the image processing apparatus 200 is sent to the printing apparatus 100 and is subjected to printing processing in the print head 102 (not illustrated in FIG. 2).

In the image processing apparatus 200, a CPU 201 controls the entire image processing apparatus 200 according to a program stored in a HDD 203 by using a RAM 202 as a work area. The RAM 202 is a volatile memory unit and temporarily stores programs and data. The HDD 203 is a non-volatile memory unit and also stores programs and data. The CPU 201 performs the predetermined image processing on the image data to be printed by the printing apparatus 100 and then sends the image data to the printing apparatus 100 via a data transfer OF 204.

The data transfer I/F 204 is an OF for controlling exchange of data with the printing apparatus 100. USB, IEEE1394, LAN, or the like can be used as a connection method. A keyboard-mouse I/F 205 is an OF for controlling not-illustrated human interface devices (HIDs) such as a keyboard and a mouse. A user inputs various settings and commands by using the keyboard and the mouse and the keyboard-mouse OF 205 sends the inputted settings and commands to the CPU 201. A display I/F 206 is an I/F for controlling a display screen in a not-illustrated display connected to the image processing apparatus 200. The user can check various pieces of information through screens displayed on the display by the CPU 201 via the display OF 206.

Meanwhile, in the printing apparatus 100, a CPU 211 controls the entire printing apparatus 100 according to a program stored in a ROM 213 by using a RAM 212 as a work area. The RAM 212 is a volatile memory unit and temporarily stores programs and data. The ROM 213 is a non-volatile memory unit and also stores programs and data.

A data transfer OF 214 controls exchange of data with the image processing apparatus 200. An image processing accelerator 216 is hardware capable of executing image processing at higher speed than the CPU 211. The image processing accelerator 216 is activated in the case where the CPU 211 writes parameters necessary for the image processing and the image data received from the data transfer OF 214 into a predetermined address of the RAM 212. Then, the image processing accelerator 216 performs the predetermined image processing on the image data and generates print data for driving the print head 102.

A motor driver 217 is a driver for driving various motors in the printing apparatus 100 such as a carriage motor configured to move a carriage in which the print head 102 is mounted in the x-direction and a conveyance motor configured to turn the conveyance rollers 104 and the discharge rollers 107. A head controller 215 is a driver for driving the print head 102 according to the print data.

In the case where the image processing accelerator 216 generates the print data, the CPU 211 drives the various motors via the motor driver 217 and causes the print head 102 to perform a printing operation according to the print data via the head controller 215.

Note that, in the embodiment, the image processing accelerator 216 is not an essential element. In the case where the CPU 211 has a sufficient processing performance, the CPU 211 may execute the predetermined image processing.
(Image Processing Flow)

Figure 3:
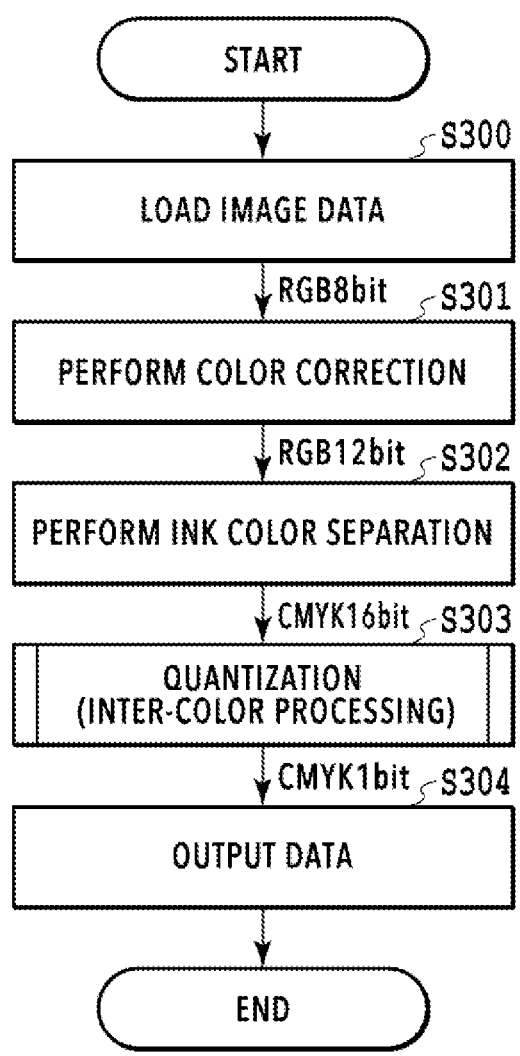
FIG. 3 is a flowchart for explaining image processing.

FIG. 3 is a flowchart for explaining the image processing executed by the CPU 201 of the image processing apparatus 200. This processing is started in the case where the user inputs a print command for printing a predetermined image.

In the case where this processing is started, in S300, the CPU 201 loads the image data to be printed into the RAM 202. In this case, the loaded image data is data formed of multiple pixels each having brightness values of red (R), green (G), and blue (B) expressed in 8-bits (256 gray scale levels). Hereafter, image data which is a collection of pixels formed of multiple elements (RGB) as described above is referred to as, for example, "RGB data."

In S301, the CPU 201 performs color correction processing on the RGB data loaded in S300. The color correction processing is processing in which a color space standardized in sRGB or the like is associated with a color space which can be expressed by the printing apparatus 100. Specifically, the CPU 201 converts the 8-bit RGB data to 12-bit R'G'B' data by referring to a three-dimensional lookup table stored in the HDD 203.

In S302, the CPU 201 performs ink color separation processing on the R'G'B' data obtained in S301. The ink color separation processing is processing in which the R'G'B' data indicating the brightness values is converted to image data indicating gradation values corresponding to the respective ink colors used in the printing apparatus 100. Specifically, the CPU 201 converts the 12-bit R'G'B' data to 16-bit CMYK data indicating gradation values of cyan (C), magenta (M), yellow (Y), and black (K) by referring to a three-dimensional lookup table. The ink color separation processing generates 16-bit gray scale data for four channels.

In S303, the CPU 201 performs quantization processing on the 16-bit CMYK data. In the embodiment, the 16-bit CMYK data is quantized into binary 1-bit data indicating printing (1) or non-printing (0) for each pixel. Details of the quantization processing are described later.

In S304, the CPU 201 outputs 1-bit data for each color obtained by the quantization processing in S303 to the printing apparatus 100 via the data transfer OF 204. The processing is thus completed.

Note that, although description is given above of the mode in which the image processing apparatus 200 performs all of the steps described in FIG. 3, the image processing accelerator 216 (see FIG. 2) of the printing apparatus 100 may perform some or all of the steps described in FIG. 3.
(Details of Quantization Processing)

Figure 4:
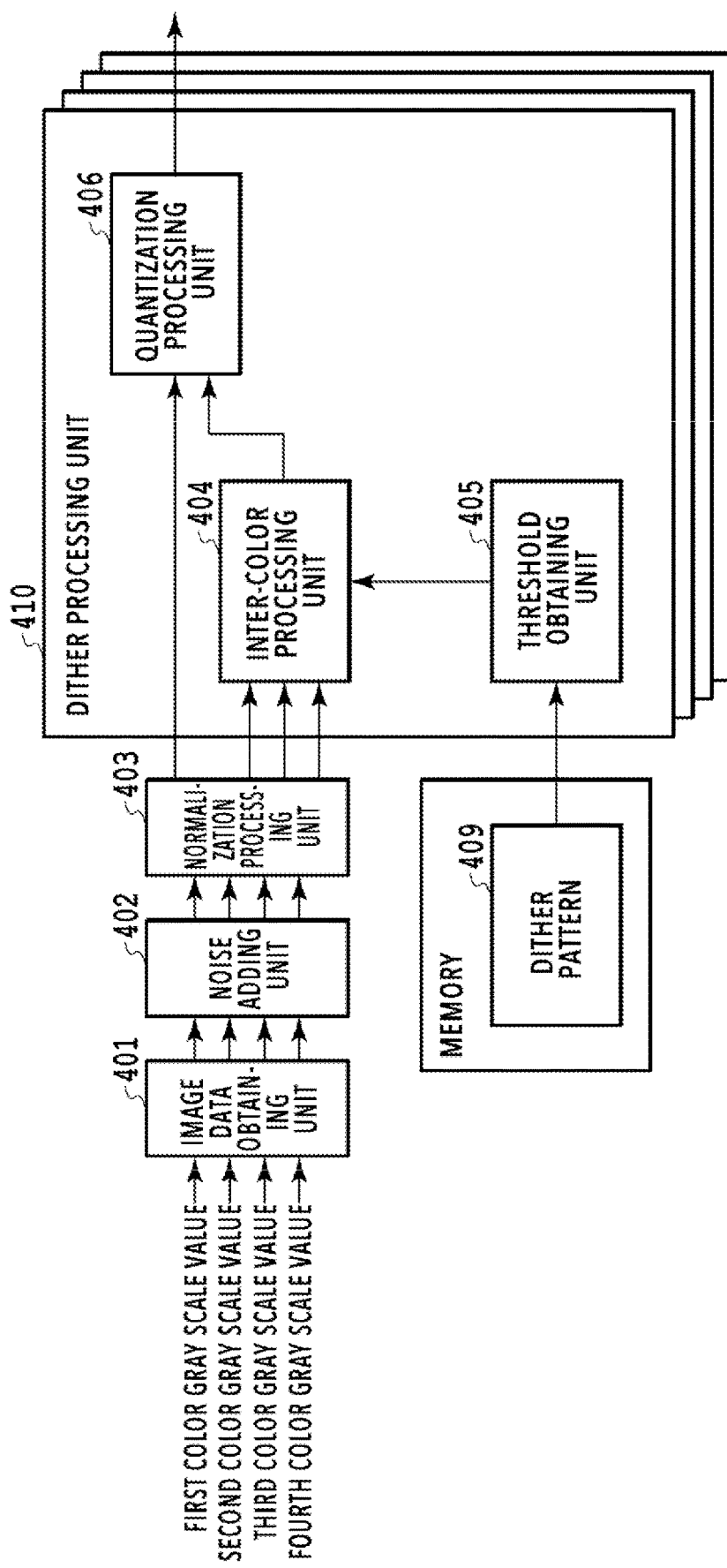
FIG. 4 is a block diagram for explaining details of quantization processing.

FIG. 4 is a block diagram for explaining details of the quantization processing executed in S303 of FIG. 3. In the quantization processing of the embodiment, first, processing relating to the gradation values of each inputted pixel is performed, then processing relating to a threshold is performed, and lastly quantization processing using a dither method is performed. The series of these processes is performed in parallel for all colors (all channels). The quantization processing for a certain color (channel) is described in detail with reference to FIG. 4.

An image data obtaining unit 401 obtains 16-bit gradation values of the respective ink colors for each pixel. FIG. 4 illustrates a state where the 16-bit gradation values of the respective first to fourth colors are inputted.

A noise adding unit 402 adds predetermined noise to the 16-bit gradation values. Adding the noise can avoid a state where the same pattern is consecutively printed and suppress generation of stripes and textures also in the case where the pixels having the gradation values of the same level are consecutively arranged. In the noise adding unit 402, noise generated by using a code indicated by a predetermined random table, a fixed intensity, and a fluctuating intensity corresponding to an input value is added to the gradation values for each pixel. In this case, the random table is a table for setting positive or negative of the noise and positive, zero, or negative is set for each pixel position. In the embodiment, there may be eight random tables at maximum and the table size of each table can be set to any size. The fixed intensity indicates the intensity of the noise amount and the magnitude of the noise is determined depending on this intensity. In the embodiment, an optimal random table and an optimal fixed intensity are set for each print mode depending on the graininess of the image, degrees of stripes and texture, and the like and the noise amount is thereby adjusted to an appropriate amount.

A normalization processing unit 403 normalizes the 16-bit gradation values to which the noise is added into a range of 12 bits. Specifically, the normalization processing unit 403 normalizes the 65535-level gradation values expressed in 16 bits into 4096-level gradation values expressed in 12 bits.

The aforementioned processing of the image data obtaining unit 401 to the normalization processing unit 403 is performed in parallel for all colors (all channels). Then, the 12-bit data for the four colors indicating the gradation values of cyan, magenta, yellow, and black is inputted into dither processing units 410 for the respective four channels.

In each dither processing unit 410, the gradation value of a processing target color to be quantified is sent to a quantization processing unit 406 as it is as a processing target gradation value. Meanwhile, the gradation values of the colors other than the processing target color are inputted into an inter-color processing unit 404 as reference gradation values. The inter-color processing unit 404 performs predetermined processing on a threshold obtained by a threshold obtaining unit 405 based on the reference gradation values to determine a final threshold and provides the final threshold to the quantization processing unit 406. The quantization processing unit 406 compares the processing target gradation value with the threshold received from the inter-color processing unit 404 to generate a quantized value indicating printing (1) or non-printing (0).

The threshold obtaining unit 405 selects one threshold matrix corresponding to the print mode from multiple dither patterns 409 stored in a memory such as the ROM and obtains a threshold for a pixel position of the processing target gradation value. In the embodiment, each dither pattern 409 is a threshold matrix formed by arranging thresholds of 0 to 4095 such that the threshold matrix has blue noise characteristics. Each dither pattern 409 may have any size and shape such as 512×512 pixels, 256×256 pixels, and 512×256 pixels. Specifically, multiple threshold matrices varying in size and shape as described above are stored in advance in the memory and the threshold obtaining unit 405 selects the threshold matrix corresponding to the print mode from these threshold matrices. Then, the threshold obtaining unit 405 selects the threshold Dth(x, y) for the pixel position (x, y) of the processing target gradation value from multiple thresholds arranged in the selected threshold matrix and provides the threshold Dth(x, y) to the inter-color processing unit.

(General Inter-Color Processing)

In this section, first, description is given of general inter-color processing as disclosed in U.S. Pat. No. 6,867,884 and Japanese Patent Laid-Open No. 2017-38127.

Figure 5A:
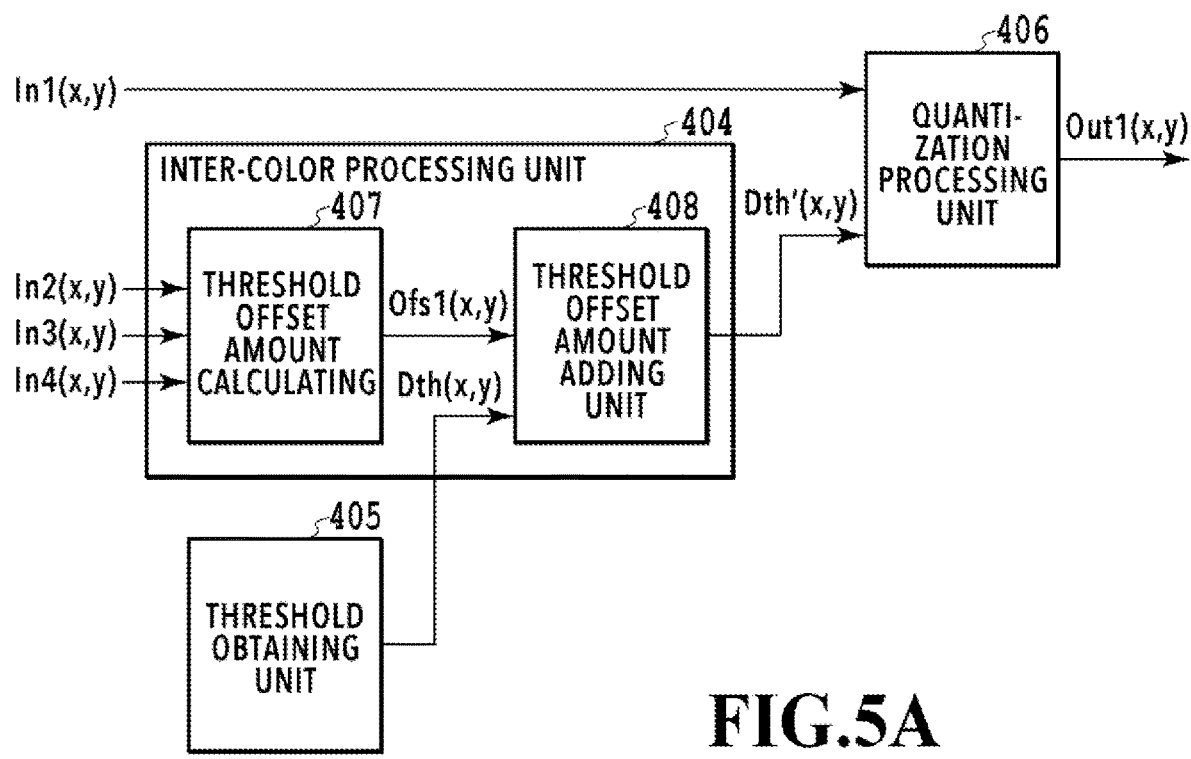
FIGS. 5A and 5B are a block diagram and a flowchart for explaining inter-color processing.
Figure 5B:
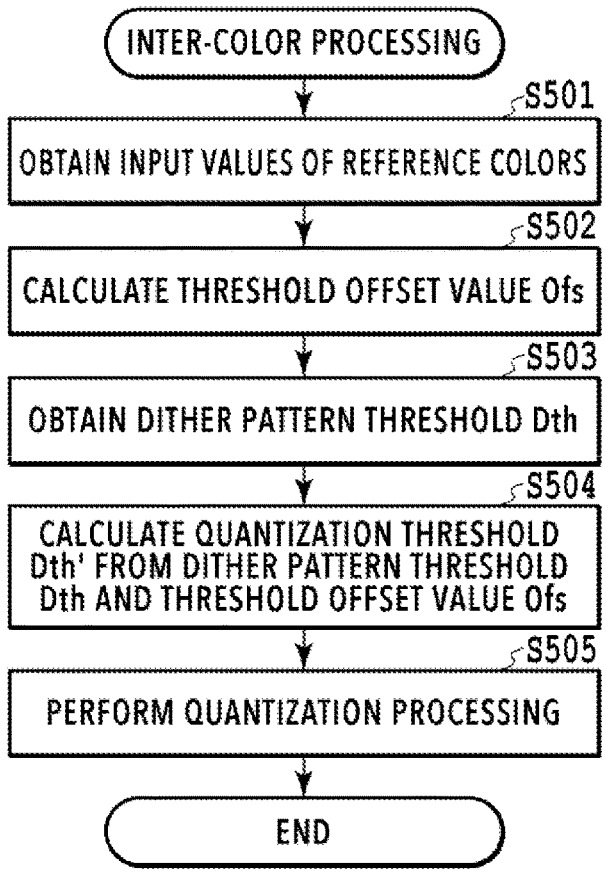

FIGS. 5A and 5B are a block diagram and a flowchart for explaining a configuration and steps of processing in the inter-color processing unit 404. The inter-color processing unit 404 sets the gradation values of the colors other than the processing target color as the reference gradation values, performs predetermined processing on the threshold Dth obtained by the threshold obtaining unit 405 by using these reference gradation values, and derives a quantization threshold Dth' for quantization of the processing target gradation value. For example, in the case where the processing target gradation value is the gradation value of black, the reference gradation values are the gradation values of cyan, magenta, and yellow.

In FIG. 5A, the processing target gradation value is denoted by In1(x, y) and the reference gradation values are denoted by In2(x, y), In3(x, y), and In4(x, y). In this case, (x, y) indicates the pixel position and is a coordinate parameter used by the threshold obtaining unit 405 to select the threshold for the pixel position of the processing target gradation value from the threshold matrix.

As illustrated in FIG. 5A, the reference gradation values In2(x, y), In3(x, y), and In4(x, y) inputted into the inter-color processing unit 404 are first inputted into a threshold offset amount calculating unit 407 (S501). Then, the threshold offset amount calculating unit 407 calculates a threshold offset value Ofs1(x, y) for the processing target gradation value In1(x, y) by using the inputted reference gradation values (S502). Although only the example in which the threshold offset value Ofs1(x, y) for the processing target gradation value In1(x, y) is obtained is described in FIGS. 5A and 5B, threshold offset values Ofs1 to Ofs4 respectively for the four processing target gradation values In1 to In4 are obtained in the respective channels. In the channels, the threshold offset values Ofs1(x, y) to Ofs4(x, y) are obtained by using the following formulae.

$$Ofs1(x,y)=0 \quad \text{(Formula 1-1)}$$

$$Ofs2(x,y)=In1(x,y) \quad \text{(Formula 1-2)}$$

$$Ofs3(x,y)=In1(x,y)+In2(x,y) \quad \text{(Formula 1-3)}$$

$$Ofs4(x,y)=In1(x,y)+In2(x,y)+In3(x,y) \quad \text{(Formula 1-4)}$$

The calculated threshold offset values Ofs1 (x, y) to Ofs4(x, y) are inputted into threshold offset amount adding units 408 in the respective channels. Since the following processing is the same in all channels, description is given by using In(x, y) and Ofs(x, y) as common references symbols respectively for the processing target gradation value and the threshold offset value.

Each threshold offset amount adding unit 408 obtains the threshold Dth (x, y) for the processing target gradation value In(x, y) at coordinates (x, y) from the threshold obtaining unit 405 (S503).

In S504, the threshold offset amount adding unit 408 subtracts the threshold offset value Ofs(x, y) received from the threshold offset amount calculating unit 407 from the threshold Dth(x, y) received from the threshold obtaining unit 405 to obtain the quantization threshold Dth'(x, y).

$$Dth'(x,y)=Dth(x,y)-Ofs(x,y) \quad \text{(Formula 2)}$$

In this case, if Dth'(x, y) takes a negative value, the threshold offset amount adding unit 408 adds the maximum value Dth_max (hereafter referred to as maximum threshold) of the thresholds included in the dither pattern to Dth'(x, y) and sets the obtained value as the quantization threshold Dth'(x, y).

Specifically, in the case of Dth'(x, y)<0, $$Dth'(x,y)=Dth'(x,y)+Dth\_max \quad \text{(Formula 3)}.$$

The value which the quantization threshold Dth'(x, y) can take is thus within a range of 0≤Dth'(x, y)≤Dth_max.

In the case where the quantization threshold Dth'(x, y) is obtained by using (Formula 2) or (Formula 3), the quantization processing unit 406 compares the quantization threshold Dth'(x, y) with the processing target gradation value In(x, y). Then, the quantization processing unit 406 generates a quantized value Out(x, y) expressing printing (1) or non-printing (0) for the pixel position (x, y) which is the processing target (S505). This processing is thus completed.

Figure 6:
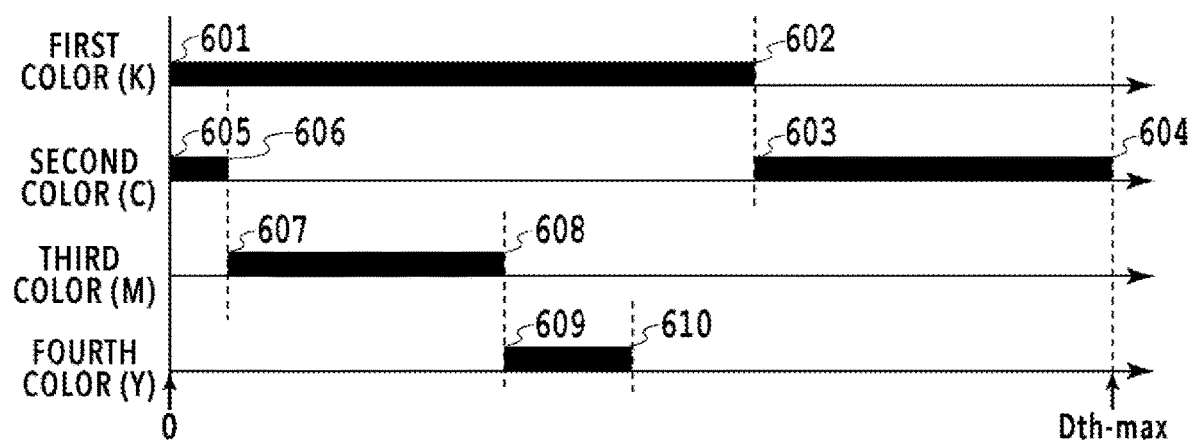
FIG. 6 is a graph indicating a range of thresholds according to which a determination result of printing is given.

FIG. 6 is a graph indicating a range of thresholds according to which the determination result of printing (1) is given in thresholds 0 to Dth_max arranged in the threshold matrix in the case where the same first gradation values, the same second gradation values, the same third gradation values, and the same fourth gradation values (In1 to In4) corresponding to the first to fourth colors are uniformly inputted in a predetermined pixel region. The horizontal axis is the threshold Dth and represents the range of 0 to Dth_max (maximum threshold). Bold lines corresponding to the respective colors each represent the range of thresholds according to which the determination result of printing (1) is given.

In this example, the threshold offset value for the first color is Ofs1=0 from (Formula 1-1). Accordingly, the quantized values Out(x, y) are set to printing (1) for the pixel positions the thresholds for which are included in a range of 0 to In1 (601 to 602).

The threshold offset value for the second color is Ofs2=In1 from (Formula 1-2). In this example, In1+In2 is assumed to be greater than Dth_max. In this case, regarding a region in which the threshold offset values are higher than Dth_max, the quantized values Out(x, y) are set to printing (1) for a region corresponding to a remainder of division of (In1+In2) by Dth_max, that is the pixel positions the thresholds for which are 0 to In1+In2-Dth_max. Accordingly, the range of thresholds according to which the determination result of printing (1) is given includes In1 to Dth_max (603 to 604) and 0 to In1+In2-Dth_max-1 (605 to 606).

The threshold offset value for the third color is Ofs3=In1+In2 from (Formula 1-3). Accordingly, the quantized values Out(x, y) are set to printing (1) for the pixel positions the thresholds for which are In1+In2-Dth_max to In1+In2+In3-Dth_max-1 (607~608).

The threshold offset value for the fourth color is Ofs4=In1+In2+In3 from (Formula 1-4). Accordingly, the quantized values Out(x, y) are set to printing (1) for the pixel positions the thresholds for which are In1+In2+In3-Dth_max to In1+In2+In3+In4-Dth_max-1 (609 to 610).

In the example of FIG. 6, there are thresholds according to which determination of printing (1) is given to two colors out of the first to fourth colors and overlapping dots in which inks of two colors overlap each other are formed on a print medium. However, for example, in the case where the value of In1+In2+In3+In4 is smaller than Dth_max, there are no thresholds according to which determination of printing (1) is given to two or more colors and all ink colors are printed at exclusive pixel positions. Accordingly, in the case where a matrix with blue noise characteristics is used as the threshold matrix, it is possible to arrange dots in a highly-dispersed manner while avoiding overlapping of dots of different colors.

As described above, in the general inter-color processing, although the same threshold matrix is used, the quantization threshold Dth' unique to each color is obtained by using each other's gradation values as the offset values. Then, the processing of quantization to printing (1) or non-printing (0) is performed by using the newly-obtained quantization threshold Dth' and this can minimize the overlapping of dots of inks of multiple colors on the print medium.

However, in FIG. 6, in the case where the first color is an ink with high surface tension and the second to fourth colors are inks with low surface tension, the regions of 605 to 606, 607 to 608, and 609 to 609 are regions in which the ink with high surface tension is printed to overlap the inks with low surface tension. In this case, the ink with high surface tension penetrates in a depth direction of the print medium together with the inks with low surface tension and this causes a decrease in image density and a deterioration in coloring property of the ink with high surface tension.

(Inter-Color Processing of Embodiment)

In light of the aforementioned matters, in the embodiment, the inter-color processing is performed such that, in the situation where inks of multiple colors are printed in an overlapping manner, the ink with high surface tension is printed with minimum possible overlapping with the other inks.

Figure 7A:
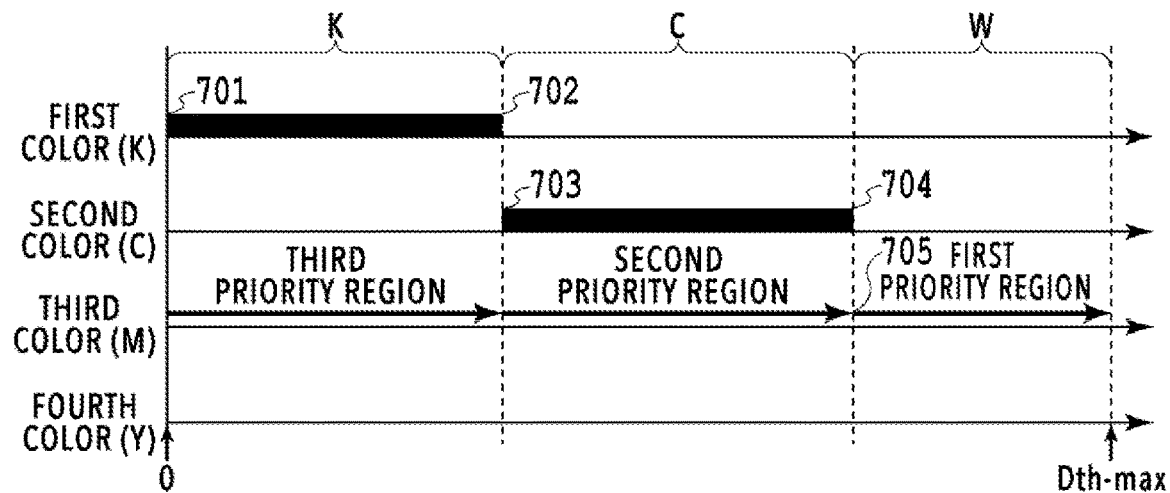
FIGS. 7A and 7B are graphs for explaining the inter-color processing in the embodiment.
Figure 7B:
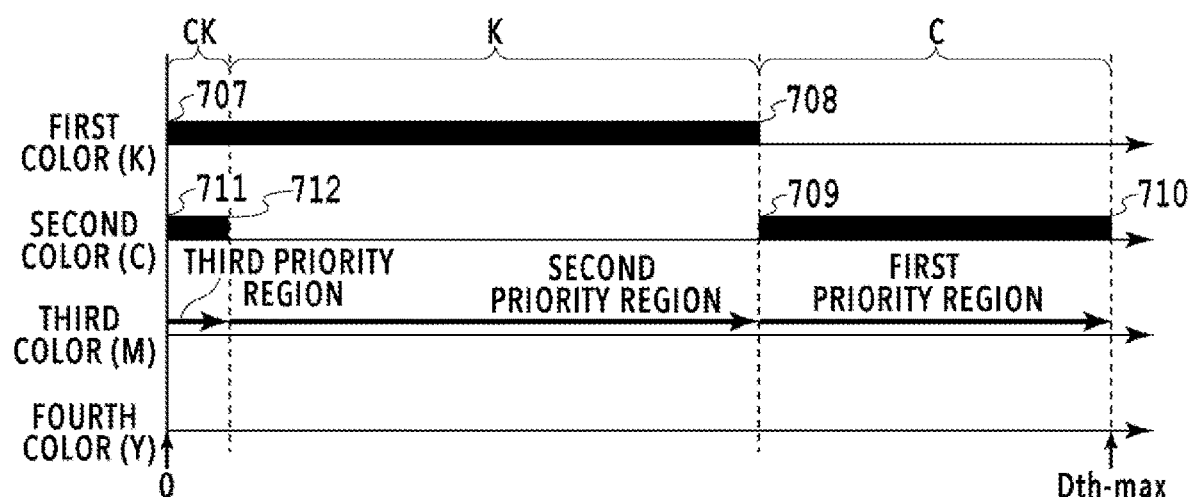

FIGS. 7A and 7B are graphs for explaining the inter-color processing in the embodiment. As in FIG. 6, the horizontal axis represents the range (0 to Dth_max) of values which the threshold Dth can take. FIGS. 7A and 7B illustrate a state where the same first gradation values In1, the same second gradation values In2, the same third gradation values In3, and the same fourth gradation values In4 of the first to fourth colors are uniformly inputted in a predetermined pixel region and the quantization processing is completed for the gradation value In1 of the first color and the gradation value In2 of the second color.

FIG. 7A illustrates the case of (In1+In2)<Dth_max. In this case, the threshold range (0 to Dth_max) is divided into a region (701 to 702) in which only the first color is set to printing (1), a region (703 to 704) in which only the second color is set to printing (1), and a region (705 to Dth_max) in which both colors are set to non-printing (0). Specifically, the print medium has, in a mixed manner, pixel regions in which the single-color dots of black being the first color are printed, pixel regions in which the single-color dots of cyan being the second color are printed, and pixel regions in which neither dots of black nor dots of cyan are printed. In other words, there are no overlapping dots of black and cyan. Accordingly, the deterioration in coloring property and a decrease in image density of the black dots are not caused by the overlapping of the black dots with the cyan dots.

Meanwhile, FIG. 7B illustrates the case of (In1+In2)>Dth_max. In this case, the threshold range (0 to Dth_max) is divided into a region (712 to 708) in which only the first color is set to printing (1), a region (709 to 710) in which only the second color is set to printing (1), and a region (711 to 712) in which both colors are set to printing (1). Specifically, the print medium has, in a mixed manner, pixel regions in which the single-color dots of black are printed, pixel regions in which single-color dots of cyan are printed, and pixel regions in which the overlapping dots of black and cyan are printed. Note that, since the inter-color processing is performed, the formation of the overlapping dots of black and cyan are suppressed to minimum. Accordingly, the deterioration in coloring property and the decrease in density of the black dots caused by the overlapping with the cyan dots are suppressed to minimum.

Next, assume the case where quantization for magenta being the third color and yellow being the fourth color is performed with the quantization for the first and second colors performed as described above. In the embodiment, since the surface tension of the black ink which is the first color is higher than the surface tension of the other inks, the quantization processing is controlled such that the black ink is printed with minimum possible overlapping with the other inks. Specifically, the threshold offset values are adjusted such that the third and fourth colors are also set to printing (1) preferentially in a region in which the first color is set to non-printing (0).

For example, in the case where printing with the third color is to be further performed in the state of FIG. 7A, a region (705 to Dth_max) in which the first and second colors are set to non-printing (0) is set as a first priority region. Then, a region (703 to 704) in which only cyan (second color) with low surface tension is set to printing (1) is set as a second priority region and a region (701 to 702) in which only black (first color) with high surface tension is set to printing (1) is set as a third priority region. Note that the third color is set to printing (1) in the second priority region in the case of (In1+In2+In3)>Dth_max. The third color is set to printing (1) only in the first priority region in the case of (In1+In2+In3)<Dth_max.

Meanwhile, in the case where printing with the third color is to be further performed in the state of FIG. 7B, since there is no region where the first and second colors are set to non-printing (0), a region (709 to 710) in which only cyan (second color) with low surface tension is set to printing (1) is set as the first priority region. Then, a region (712 to 708) in which only black (first color) with high surface tension is set to printing (1) is set as the second priority region and a region (711 to 712) in which the first and second colors are set to printing (1) is set as the third priority region. Note that the third color is set to printing (1) in the second priority region in the case of (In1+In3)>Dth_max. The third color is set to printing (1) only in the first priority region in the case of (In1+In3)<Dth_max.

Figure 8:
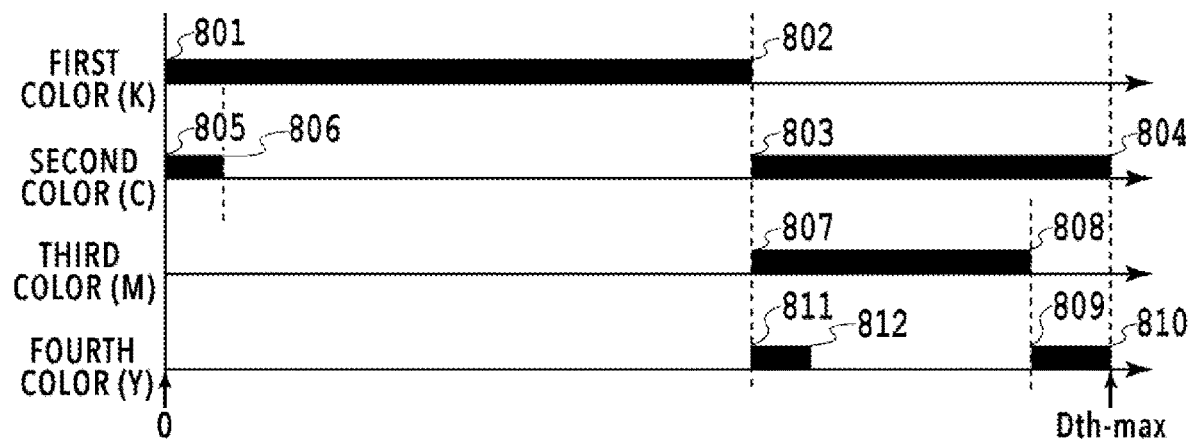
FIG. 8 is a graph illustrating results of quantization for first to fourth colors.

FIG. 8 illustrates a result of quantization of the third color (magenta) and the fourth color (yellow) performed in the state where the first color and the second color are subjected to the quantization processing as in FIG. 7B. A region (807 to 808) in which the third color is determined to be set to printing (1) is entirely included in the first priority region and all magenta dots are printed to overlap not the black dots but the cyan dots.

The same applies to the fourth color. The fourth color is avoided as much as possible to be set to printing (1) in a region (801 to 802) in which black with high surface tension is set to printing (1). Moreover, the order of priority is determined such that the fourth color is set to printing (1) as much as possible outside regions where the other inks are set to printing (1), in a region (803 to 804) in which black is set to non-printing (0). Accordingly, a region (809 to 810) in which only cyan (second color) is set to printing (1) is set as the first priority region in the regions where the fourth color is set to printing (1). Then, a region (807 to 808) in which the second and third colors are set to printing (1) is set as the second priority region and a region (806 to 803) in which only the first color is set to printing (1) is set as the third priority region. Moreover, a region (805 to 806) in which the first and second colors are set to printing (1) is set as the fourth priority region.

FIG. 8 illustrates the case where yellow being the fourth color is set to printing (1) in the entire first priority region (809 to 810) and part (811 to 812) of the second priority region. In most of the region in which the first color is set to printing (1) in the entire threshold region, the second to fourth colors are set to non-printing (0) and many of the black dots can be printed without overlapping dots of the other inks.

As described above, in the inter-color processing of the embodiment, the same processing as the conventional inter-color processing is performed for the first and second colors. Then, for the third color and beyond, the offset value Ofs to be used in the inter-color processing is adjusted such that the threshold region in which the color is set to printing (1) is set according to the aforementioned order of priority.

Figure 9:
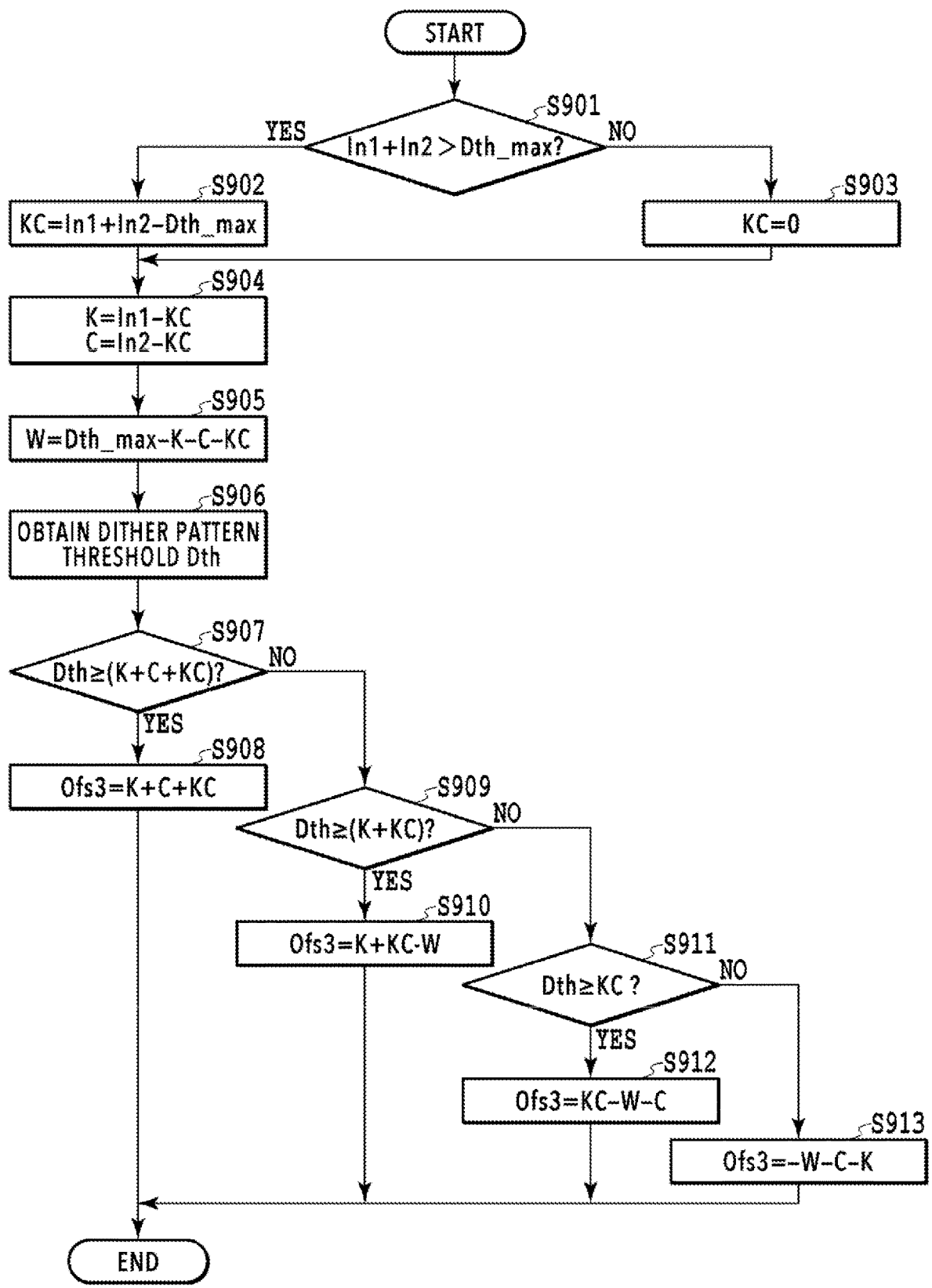
FIG. 9 is a flowchart for explaining a method of deriving an offset value of the third color.

FIG. 9 is a flowchart for explaining a method of deriving the offset value Ofs3 of the third color in the inter-color processing of the embodiment. This processing corresponds to the processing executed by the threshold offset amount calculating unit 407 (see FIG. 5A) in S503 of FIG. 5B. In the following processing, in order to simplify the description, the pixel position (x, y) is omitted unless it is necessary.

In the case where the processing is started, the threshold offset amount calculating unit 407 determines whether the sum of the gradation value In1 of the first color and the gradation value In2 of the second color is greater than the maximum threshold Dth_max (S901). In the case where the sum is greater than the maximum threshold Dth_max, the processing proceeds to S902. In the case where the sum is not greater than the maximum threshold Dth_max, the processing proceeds to S903.

In S902 and S903, the threshold offset amount calculating unit 407 calculates the number KC of thresholds according to which the quantized values of the first and second colors are set to printing (1) in the entire threshold region (0 to Dth_max). Specifically, KC=In1+In2−Dth_max in S902, and KC=0 in S903.

In S904, the threshold offset amount calculating unit 407 calculates: the number K of thresholds according to which the quantized value of the first color is set to (1) while the quantized value of the second color is set to (0); and the number C of thresholds according to which the quantized value of the second color is set to (1) while the quantized value of the first color is set to (0), in the entire threshold region (0 to Dth_max).

K=In1−KC

C=In2−KC

In S905, the threshold offset amount calculating unit 407 calculates the number W of thresholds according to which the quantized values of the first and second colors are set to non-printing (0) in the entire threshold region (0 to Dth_max).

$$W=Dth\_max-K-C-KC$$

In S906, the threshold offset amount calculating unit 407 obtains the threshold Dth for the gradation values In3(x, y) of the third color at the coordinates (x, y).

In S907, the threshold offset amount calculating unit 407 determines whether the obtained threshold Dth is (K+C+KC) or greater. In the case where Dth is (K+C+KC) or greater in S907, the processing proceeds to S908 and the threshold offset amount calculating unit 407 calculates the threshold offset value Ofs3 of the third color according to (Formula 4-1).

$$Ofs3=K+C+KC \quad \text{(Formula 4-1)}$$

In the case where Dth is smaller than (K+C+KC) in S907, the processing proceeds to S909 and the threshold offset amount calculating unit 407 determines whether the threshold Dth is (K+KC) or greater. In the case where Dth is (K+KC) or greater in S909, the processing proceeds to S910 and the threshold offset amount calculating unit 407 calculates the threshold offset value Ofs3 of the third color according to (Formula 4-2).

$$Ofs3=K+KC-W \quad \text{(Formula 4-2)}$$

In the case where Dth is smaller than (K+KC) in S909, the processing proceeds to S911 and the threshold offset amount calculating unit 407 determines whether the threshold Dth is KC or greater. In the case where Dth is KC or greater in S911, the processing proceeds to S912 and the threshold offset amount calculating unit 407 calculates the threshold offset value Ofs3 of the third color according to (Formula 4-3).

$$Ofs3=KC-W-C \quad \text{(Formula 4-3)}$$

In the case where Dth is smaller than KC in S911, the processing proceeds to S913 and the threshold offset amount calculating unit 407 calculates the threshold offset value Ofs3 of the third color according to (Formula 4-4).

$$Ofs3=-W-C-K \quad \text{(Formula 4-4)}$$

The processing is thus completed. The calculated threshold offset value Ofs3 of the third color is provided to the threshold offset amount adding unit 408 (see FIG. 5A) and the processing of S504 and beyond in FIG. 5B is performed.

In FIG. 9, the case where the offset value Ofs3 is obtained in S908 is the case where the offset value Ofs3 is set such that the third color is set to printing (1) in the region where the first and second colors are set to non-printing (0) as in the first priority region of FIG. 7A. Moreover, the case where the offset value Ofs3 is obtained in S910 is the case where the offset value Ofs3 is set such that the third color is set to printing (1) in the region where only the second color is set to printing (1) as in the second priority region of FIG. 7A and the first priority region of FIG. 7B. Furthermore, the case where the offset value Ofs3 is obtained in S912 is the case where the offset value Ofs3 is set such that the third color is set to printing (1) in the region where only the first color is set to printing (1) as in the third priority region of FIG. 7A and the second priority region of FIG. 7B. Moreover, the case where the offset value Ofs3 is obtained in S914 is the case where the offset value Ofs3 is set such that the third color is set to printing (1) in the region where the first and second colors are both set to printing (1).

As described above, in the determination steps and the steps of setting the offset value Ofs3 in S907 to S913, the quantization processing for magenta being the third color can be performed according to the order of priority as described in FIGS. 7A and 7B. As a result, it is possible suppress frequency of occurrence of the case where the black ink with high surface tension is printed to overlap the other inks with low surface tension and output an image with high density and excellent coloring property.

Figure 10A:
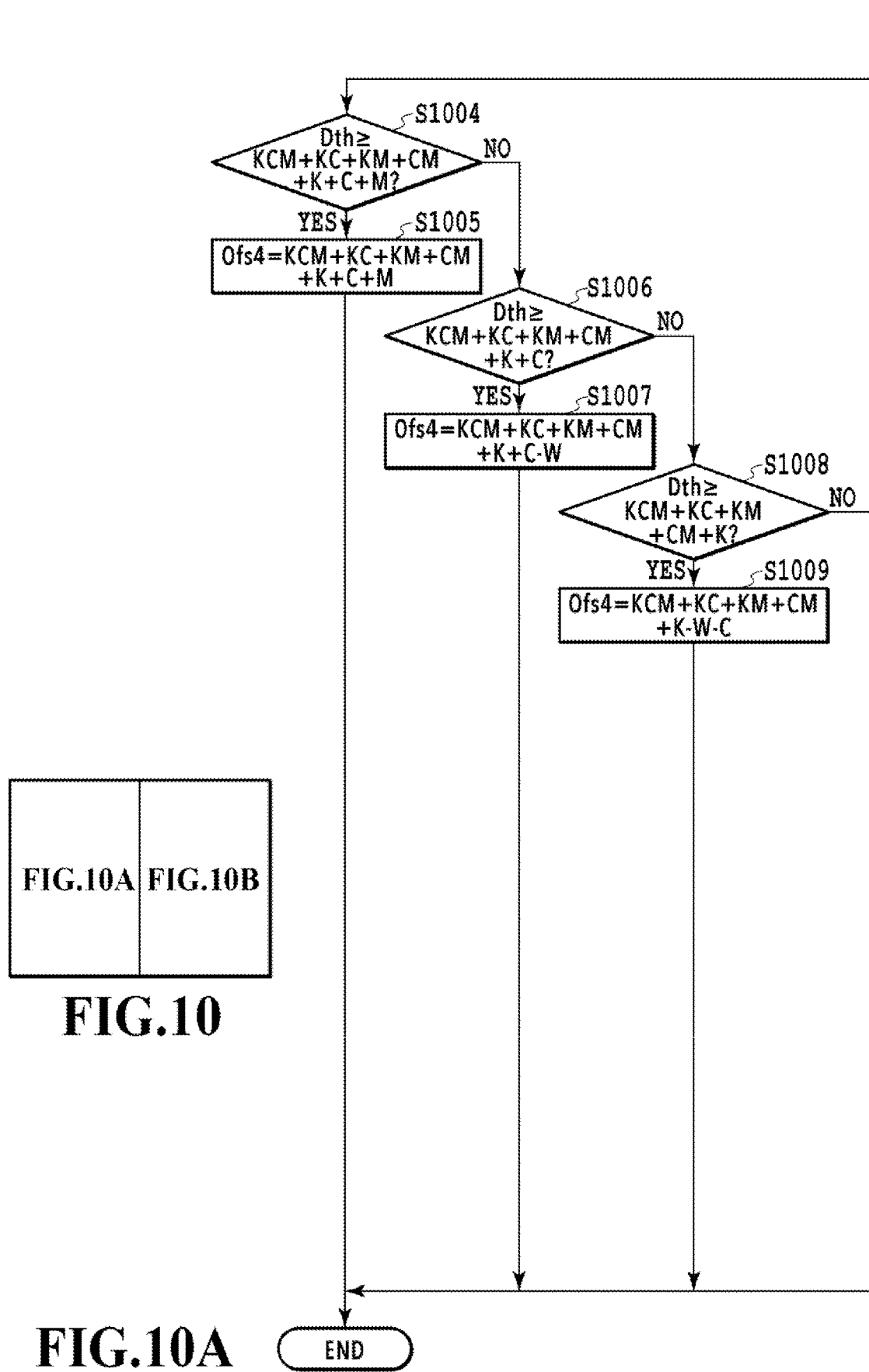
FIG. 10A is a flowchart for explaining a method of deriving an offset value of the fourth color.
Figure 10B:
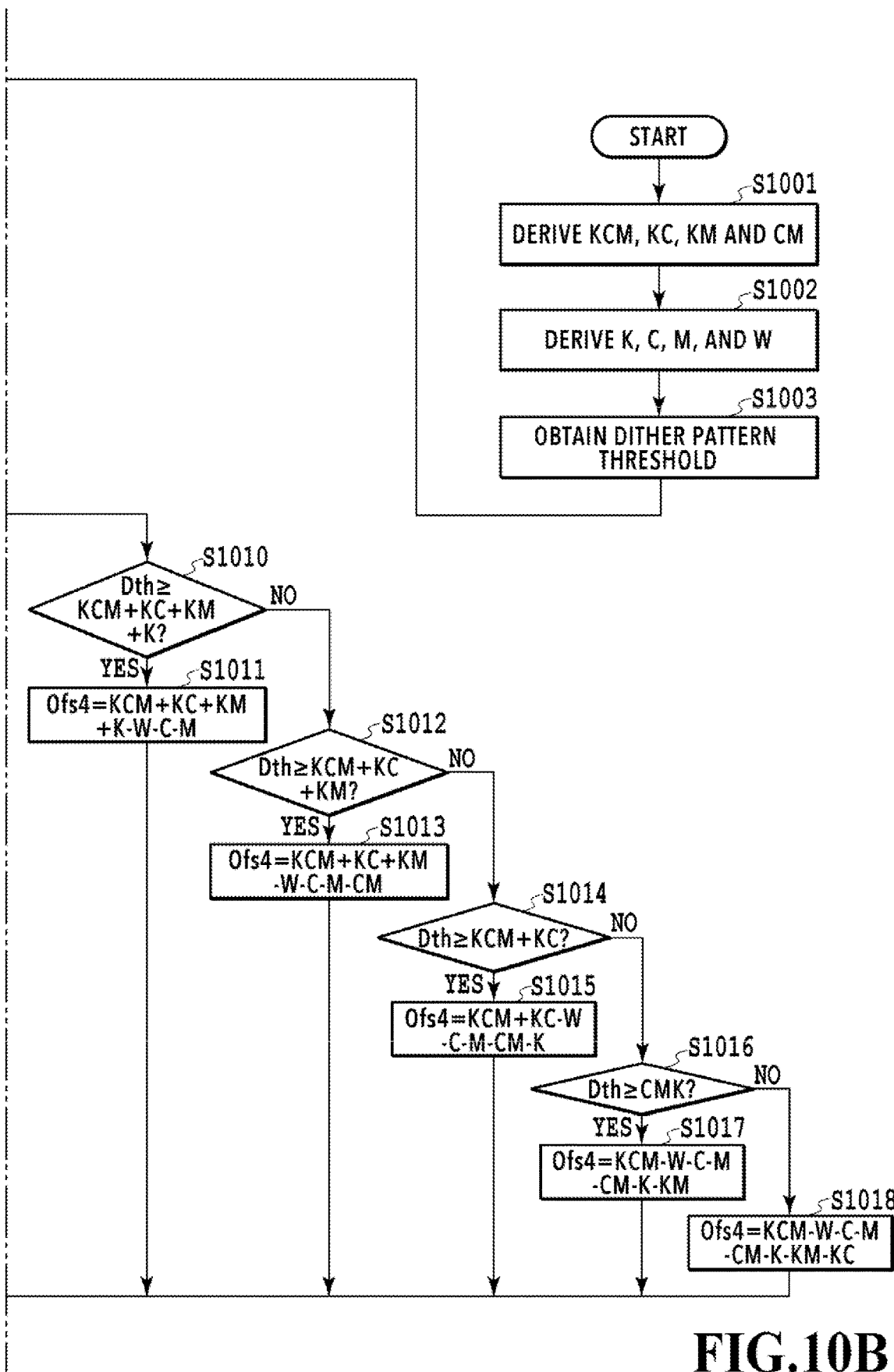
FIG. 10B is a flowchart for explaining a method of deriving an offset value of the fourth color.

FIGS. 10A and 10B are flowcharts for explaining a method of deriving the offset value Ofs4 of the fourth color in the inter-color processing of the embodiment. This processing also corresponds to the processing executed by the threshold offset amount calculating unit 407 (see FIG. 5A) in S503 of FIG. 5B.

In the case where the processing is started, in S1001, the threshold offset amount calculating unit 407 derives KCM, KC, KM, and CM according to the following formulae by using the gradation value In1 of the first color, the gradation value In2 of the second color, and the gradation value In3 of the third color.

$$KCM = \max(In1+In2+In3-2\times Dth\_max, 0)$$

$$KC = \max(In1+In2-KCM-Dth\_max, 0)$$

$$KM = \max(In1+In3-KCM-Dth\_max, 0)$$

$$CM = \max(In1+1n2+In3-2\times KCM-KC-KM-Dth\_max, 0)$$

In this case, KCM is the number of thresholds according to which the quantized values of the first, second, and third colors are all set to printing (1) in the entire threshold region (0 to Dth_max). Moreover, KC is the number of thresholds according to which the quantized values of the first and second colors are set to printing (1) and the quantized value of the third color is set to non-printing (0) in the entire threshold region (0 to Dth_max). Furthermore, KM is the number of thresholds according to which the quantized values of the first and third colors are both set to printing (1) and the quantized value of the second color is set to non-printing (0) in the entire threshold region (0 to Dth_max). Moreover, CM is the number of thresholds according to which the quantized values of the second and third colors are set to printing (1) and the quantized value of the first color is set to non-printing (0) in the entire threshold region (0 to Dth_max). Furthermore, "max (X, Y)" is a function which returns a greater one of the two parameters X and Y.

In S1002, the threshold offset amount calculating unit 407 calculates K, C, M, and W according to the following formulae by using KCM, KC, KM, and CM obtained in S1001. In this case, K is the number of thresholds according to which the quantized value of the first color (black) is set to (1) and the quantized values of the second color (cyan) and the third color (magenta) are set to (0) in the entire threshold region (0 to Dth_max). C is the number of thresholds according to which the quantized value of the second color is set to (1) and the quantized values of the first and third colors are set to (0) in the entire threshold region (0 to Dth_max). M is the number of thresholds according to which the quantized value of the third color is set to (1) and the quantized values of the first and second colors are set to (0) in the entire threshold region (0 to Dth_max). W is the number of thresholds according to which the quantized values of the first, second, and third colors are set to non-printing (0) in the entire threshold region (0 to Dth_max).

$$K = In1 - KCM - KC - KM$$

$$C = In2 - KCM - KC - CM$$

$$M = In3 - KCM - KM - CM$$

$$W = Dth\_max - KCM - KC - KM - K - C - M$$

In S1003, the threshold offset amount calculating unit 407 obtains the threshold Dth for the gradation value In4(x, y) of the fourth color at the coordinates (x, y). The offset value Ofs4 of the fourth color is calculated according to the favorable order of priority from the threshold region divided into eight types by the steps of S1004 to S1018. The processing is thus completed.

Thereafter, the calculated threshold offset value Ofs4 of the fourth color is provided to the threshold offset amount adding unit 408, the processing of S504 and beyond is performed, and the quantization threshold Out4 of the fourth color is derived.

According to the aforementioned flowchart, the region in which the quantized values of all three colors of the first to third colors are set to non-printing (0) is set to have the highest priority in the entire threshold region (0 to Dth_max) (S1005). Moreover, the regions in which the second color (cyan) and the third color (magenta) are set to non-printing (0) among the threshold regions in which the first color (black) is set to non-printing (0) are set to have the next highest priorities. Then, the regions in which the second color (cyan) and the third color (magenta) are set to printing (1) among the threshold regions in which the first color (black) is set to printing (1) are set to have the next highest priorities.

Note that although the case where the quantization thresholds Dth' are obtained and the quantized values are generated for the first, second, third, and fourth colors in this order is described above, the quantization processing can be performed in parallel for the aforementioned four colors. This is because, although the quantization threshold Dth' of each color is obtained by using the gradation values (In1 to In4) of the other colors, the quantization threshold Dth' is obtained without using the quantized values (Out1 to Out4) of the other colors.

Moreover, each of the second to fourth colors may be switched to any of cyan, magenta, and yellow as long as the ink with relatively high surface tension is set as the first color and the inks with relatively low surface tension are set as the second to fourth colors.

Furthermore, although description is given above of the example in which the surface tension of the black ink is higher than the surface tension of the other color inks, the ink with high surface tension may be an ink of another color. In any case, the density and coloring property of an image to be outputted can be improved by performing the aforementioned characteristic inter-color processing with the ink with relatively high surface tension set as the first color.

According to the aforementioned embodiment, in the configuration in which the gradation values of the respective ink colors used in the printing apparatus are quantized by using the inter-color processing, the ink with high surface tension is set as the first color in the inter-color processing and the inks with low surface tension are set as the second color and beyond in the inter-color processing. Then, the same inter-color processing as that in the conventional technique is performed for the first and second colors. Meanwhile, for each of the colors of the third color and beyond, the offset value Ofs in the inter-color processing is set such that the color is avoided as much as possible to be set to printing (1) at the same pixel position as the first color with high surface tension. This suppresses occurrence of the case where the ink with high surface tension penetrates in the depth direction of the print medium due to the inks with low surface tension and an image with high density and excellent coloring property can be outputted.

Second Embodiment

Also in this embodiment, as in the first embodiment, image processing is performed in the steps illustrated in FIG. 3 by using the printing apparatus 100 and the image processing apparatus 200 illustrated in FIGS. 1 and 2. However, the print head 102 of the embodiment can eject five inks including an ink of gray (Gr) in addition to the inks of black (K), cyan (C), magenta (M), and yellow (Y) described in the first embodiment. In this case, the gray ink is assumed to have relatively high surface tension which is equivalent to that of the black (K) ink.

In the inter-color processing of the embodiment, two threshold matrices different from each other are prepared for the aforementioned inks of five colors and two lines of inter-color processing is performed. Specifically, for black, cyan, and magenta, the inter-color processing using a first threshold matrix is performed with the first color being black, the second color being cyan, and the third color being magenta. Hereafter, such inter-color processing is referred to as first inter-color processing. Meanwhile, for yellow and gray, the inter-color processing using a second threshold matrix is performed with the first color being gray and the second color being yellow. Hereafter, such inter-color processing is referred to as second inter-color processing.

In the first inter-color processing, the same processing as the inter-color processing for the first to third colors in the first embodiment is performed. Specifically, the offset value Ofs1 of the first color (black) is obtained according to (Formula 1-1) and the offset value Ofs2 of the second color (cyan) is obtained according to (Formula 1-2). Moreover, the offset value Ofs3 of the third color (magenta) is obtained by using (Formula 4-1) to (Formula 4-4) according to the flowchart illustrated in FIG. 9.

Meanwhile, in the second inter-color processing, the same processing as the inter-color processing for the first and second colors in the first embodiment is performed. Specifically, the offset value Ofs1 of the first color (gray) is obtained according to (Formula 1-1) and the offset value Ofs2 of the second color (yellow) is obtained according to (Formula 1-2). The first threshold matrix and the second threshold matrix are threshold matrices different from each other but both have blue noise characteristics.

Figure 11A:
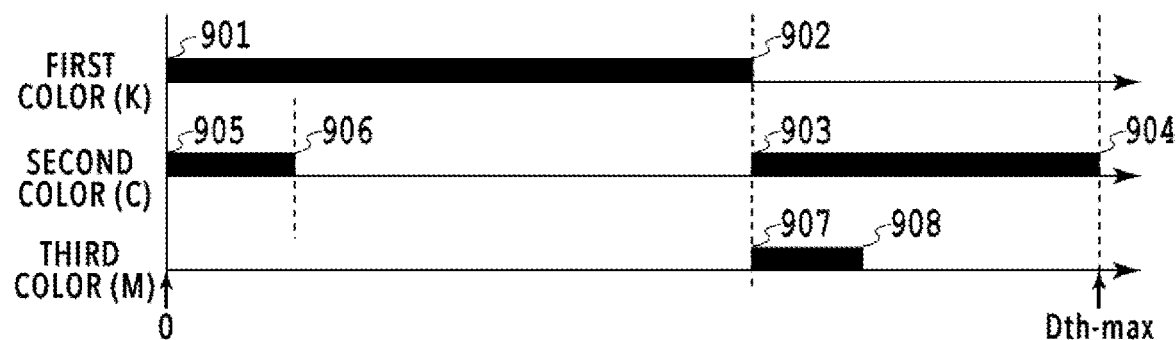
FIGS. 11A and 11B are graphs illustrating a result of first quantization processing and a result of second quantization processing, respectively.
Figure 11B:
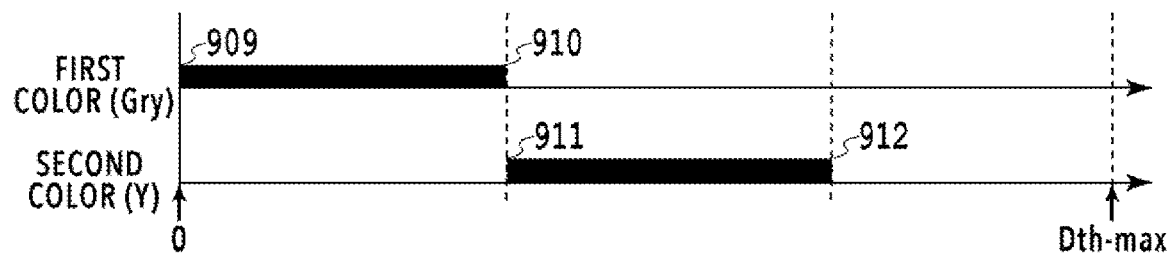

FIGS. 11A and 11B are graphs illustrating a result of the aforementioned first inter-color processing and a result of the aforementioned second inter-color processing, respectively. In the first inter-color processing illustrated in FIG. 11A, the same processing as the inter-color processing for the first to third colors in the first embodiment is performed. Accordingly, the second color (cyan) and the third color (magenta) are set to printing (1) preferentially in a region (903 to Dth_max) in which the first color (black) is set to non-printing (0). Meanwhile, in the second inter-color processing illustrated in FIG. 11B, the same processing as the inter-color processing for the first and second colors in the first embodiment is performed. Accordingly, the second color (yellow) is set to printing (1) preferentially in a region (910 to Dth_max) in which the first color (gray) is set to non-printing (0).

In the embodiment, the two types of threshold matrices with blue noise characteristics are prepared and the black ink and the gray ink whose graininess is relatively obvious are each set as the first color in the inter-color processing therefor. In this state, the offset values Ofs are set such that the inks other than the black ink and the gray ink are avoided as much as possible to be set to printing (1) in the same pixel regions as the black ink and the gray ink. According to such an embodiment, it is possible to output an image with high black density while suppressing graininess.

Third Embodiment

Also in this embodiment, as in the first embodiment, image processing is performed in the steps illustrated in FIG. 3 by using the printing apparatus 100 and the image processing apparatus 200 illustrated in FIGS. 1 and 2. However, the dither processing unit 410 of the embodiment quantizes the gradation values In1 to In4 of the respective colors to three-level values expressed in three levels of level 0 to level 2, instead of the values of two levels of printing (1) and non-printing (0).

The quantization processing of the embodiment is described with reference to the block diagram of FIG. 4 again. In the embodiment, the normalization processing unit 403 normalizes the 16-bit gradation values to which noise is added into a 13-bit range. Specifically, the normalization processing unit 403 converts the 65535-level gradation values expressed in 16 bits into 8192-level values expressed in 13 bits. Then, the gradation values of the four colors of cyan, magenta, yellow, and black are inputted into the dither processing units 410 of the respective four channels.

In each dither processing unit 410, the threshold obtaining unit 405 obtains the threshold matrix Dth(x, y) for the pixel position (x, y) of the processing target gradation value, from the multiple thresholds arranged in the selected threshold matrix. In the embodiment, it is assumed that the inputted gradation values are in a range of 13 bits, that is 0 to 8191 while the thresholds Dth arranged in the threshold matrix are in a range of 12 bits, that is 0 to 4096. The threshold obtaining unit 405 calculates a first threshold Dth1(x, y) and a second threshold Dth2(x, y) according to (Formula 5-1) and (Formula 5-2) based on the obtained threshold Dth(x, y). In the following description, in order to simplify the description, the pixel position (x, y) is omitted unless it is necessary.

$Dth1=Dth$ (Formula 5-1)

$Dth2=Dth+Dth\_max+1$ (Formula 5-2)

In this case, the first threshold Dth1 is a threshold used to determine whether the processing target gradation value is any one of levels 0 and 1 or not. Meanwhile, the second threshold Dth2 is a corrected threshold higher than the first threshold Dth1 and is a threshold used to determine whether the processing target gradation value is any one of levels 1 and 2 or not. The threshold obtaining unit 405 provides the generated first threshold Dth1 and second threshold Dth2 to the inter-color processing unit 404.

Next, description is given with reference to FIG. 5. Here, the relationships between the gradation value InK of black being the first color and the gradation value InC of cyan being the second color are described to simplify the description.

The threshold offset amount calculating unit 407 calculates two types of threshold offset values for the processing target gradation value, that is a first threshold offset value and a second threshold offset value, by using the reference gradation values. The first threshold offset value is used to offset the first threshold Dth1 and the second threshold offset value is used to offset the second threshold Dth2. A method of calculating these offset values are described later in detail.

The threshold offset amount adding unit 408 corrects the first threshold Dth1 and the second threshold Dth2 provided by the threshold obtaining unit 405 by using the first threshold offset value Ofs1 and the second threshold offset value Ofs2 calculated by the threshold offset amount calculating unit 407. Specifically, the first quantization threshold Dth1' and the second quantization threshold Dth2' are calculated according to (Formula 6-1) and (Formula 6-2).

$Dth1'=Dth1-Ofs1$ (Formula 6-1)

$Dth2'=Dth2-Ofs2$ (Formula 6-2)

On this occasion, in the case where the Dth1' or Dth2' takes a negative value, the maximum threshold Dth_max is added to the obtained value.

Specifically, in the case of Dth1'<0

$$Dth1'=Dth1'+Dth\_max \quad \text{(Formula 7-1)}$$

in the case of Dth2'<0

$$Dth2'=Dth2'+Dth\_max \quad \text{(Formula 7-2)}.$$

The value which the first quantization threshold Dth1' can take is thus within a range of 0≤Dth1'≤Dth_max. Moreover, the value which the second quantization threshold Dth2' can take is thus within a range of Dth_max+1≤Dth2'≤2×Dth_max.

The quantization processing unit 406 compares the inputted processing target gradation value In with the first quantization threshold Dth1' and the second quantization threshold Dth2' and generates the quantized value Out indicating one of levels 0 to 2 according to (Formula 8).

in the case of $In \leq Dth1'$ Out=0 in the case of $Dth1' < In \leq Dth2'$ Out=1 in the case of $Dth2' < In$ Out=2 (Formula 8)

Thereafter, the quantized value Out(x, y) is sent to the printing apparatus 100 as print data with three levels. In the printing apparatus 100, the ink of the corresponding color is ejected from the print head 102 to the pixel region indicated by the coordinates (x, y). In this case, the head controller 215 (see FIG. 2) of the printing apparatus 100 controls the ejection operation of the print head 102 such that the higher the level indicated by the quantized value Out is, the higher the density expressed on the print medium is. For example, the configuration may be such that, for the corresponding pixel position (x, y), no dot is printed in the case of Out=0, one dot is printed in the case of Out=1, and two dots are printed in the case of Out=2. Moreover, the configuration may be such that no dot is printed in the case of Out=0, a small dot is printed in the case of Out=1, and a large dot is printed in the case of Out=2.

Next, a method of driving the first threshold offset value Ofs1 and the second threshold offset value Ofs2 in the threshold offset amount calculating unit 407 of the embodiment is described. In the following description, the first threshold offset value and the second threshold value of the first color (black) are denoted by OfsK1 and OfsK2, respectively, and the first threshold offset value and the second threshold offset value of the second color (cyan) are denoted by OfsC1 and OfsC2, respectively.

In the case where the gradation value InK of the first color is the processing target gradation value, the first threshold offset value OfsK1 and the second threshold offset value OfsK2 are obtained according to (Formula 9-1) and (Formula 9-2).

$$OfsK1=0 \quad \text{(Formula 9-1)}$$

$$OfsK2=0 \quad \text{(Formula 9-2)}$$

Figure 12:
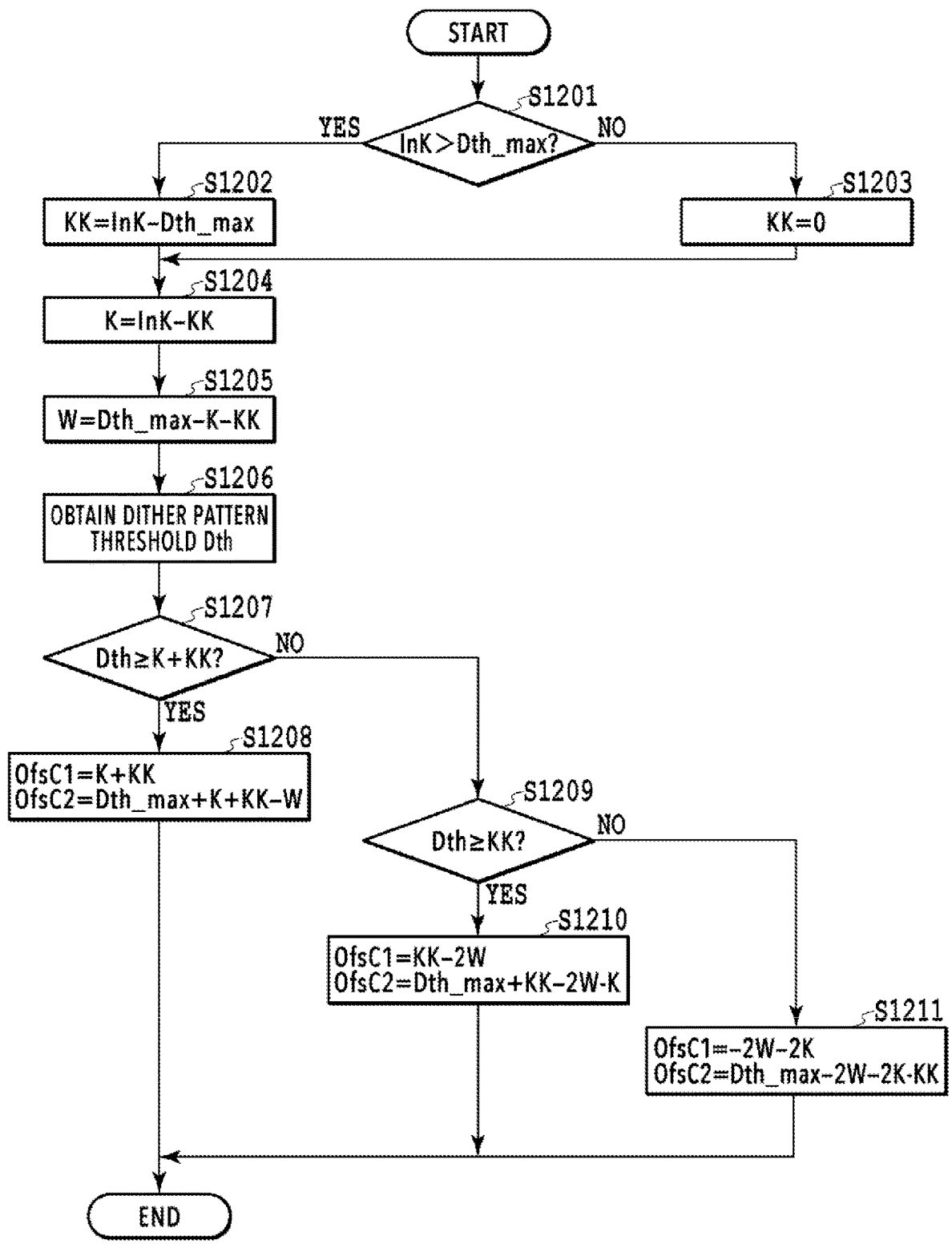
FIG. 12 is a flowchart for deriving first and second threshold offset values.

Meanwhile, in the case where the gradation value InC of the second color is the processing target gradation value, the threshold offset amount calculating unit 407 derives the first threshold offset value OfsC1 and the second threshold offset value OfsC2 according to the flowchart of FIG. 12. The steps are described below one by one.

In the case where the processing is started, the threshold offset amount calculating unit 407 determines whether the gradation value InK of the first color which is the reference gradation value is greater than the maximum threshold Dth_max (S1201). In the case where the reference gradation value InK is greater than the maximum threshold Dth_max, the processing proceeds to S1202. In the case where the reference gradation value InK is not greater than the maximum threshold Dth_max, the processing proceeds to S1203.

In S1202 and S1203, the threshold offset amount calculating unit 407 calculates the number KK of the thresholds according to which the quantized values of the first color are set to level 2 in the entire threshold region (0 to Dth_max). Specifically, in $S1202, KK=InK-Dth\_max$, and in $S1203, KK=0$.

In S1204, the threshold offset amount calculating unit 407 calculates the number K of thresholds according to which the quantized values of the first color is set to level 1 in the entire threshold region (0 to Dth_max).

$$K=InK-KK$$

In S1205, the threshold offset amount calculating unit 407 calculates the number W of the thresholds according to which the quantized values of the first color is set to level 0 in the entire threshold region (0 to Dth_max).

$$W=Dth\_max-K-KK$$

In S1206, the threshold offset amount calculating unit 407 obtains the threshold Dth for the processing target gradation value InC(x, y) at the coordinates (x, y).

In S1207, the threshold offset amount calculating unit 407 determines whether the obtained threshold Dth is (K+KK) or greater. In the case where Dth is (K+KK) or greater in S1207, the processing proceeds to S1208 and the threshold offset amount calculating unit 407 calculates the first threshold offset value OfsC1 and the second threshold offset value OfsC2 according to (Formula 10-1) and (Formula 10-2).

$$OfsC1=K+KK \quad \text{(Formula 10-1)}$$

$$OfsC2=Dth\_max+K+KK-W \quad \text{(Formula 10-2)}$$

In the case where Dth is smaller than (K+KK) in S1207, the processing proceeds to S1209 and the threshold offset amount calculating unit 407 determines whether the threshold Dth is KK or greater. In the case where Dth is KK or greater in S1209, the processing proceeds to S1210 and the threshold offset amount calculating unit 407 calculates the first threshold offset value OfsC1 and the second threshold offset value OfsC2 according to (Formula 11-1) and (Formula 11-2).

$$OfsC1=KK-2\,W \quad \text{(Formula 11-1)}$$

$$OfsC2=Dth\_max+KK-2\,W-K \quad \text{(Formula 11-2)}$$

In the case where Dth is smaller than KK in S1209, the processing proceeds to S1211 and the threshold offset amount calculating unit 407 calculates the first threshold offset value OfsC1 and the second threshold offset value OfsC2 according to (Formula 12-1) and (Formula 12-2).

$$OfsC1=-2W-2K \quad \text{(Formula 12-1)}$$

$$OfsC2=Dth\_max-2\,W-2K-KK \quad \text{(Formula 12-2)}$$

The processing is thus completed.

In S1208 of FIG. 12, the first offset value OfsC1 and the second offset value OfsC2 are set such that the second color is set to levels 1 and 2 preferentially in a region where the first color is set to level 0. In S1210, the first offset value OfsC1 and the second offset value OfsC2 are set such that the second color is set to levels 1 and 2 preferentially in a region where the first color is set to level 1. In S1211, the first offset value OfsC1 and the second offset value OfsC2 are set such that the second color is set to levels 1 and 2 in a region where the first color is set to level 2. In other words, according to the flowchart of FIG. 12, the determination steps of the S1207 and S1209 causes the first offset value OfsC1 and the second offset value OfsC2 to be set in S1208, S1210, and S1211 with the highest priority given to S1208, the next highest to S1210, and the next highest to S1211.

Figure 13:
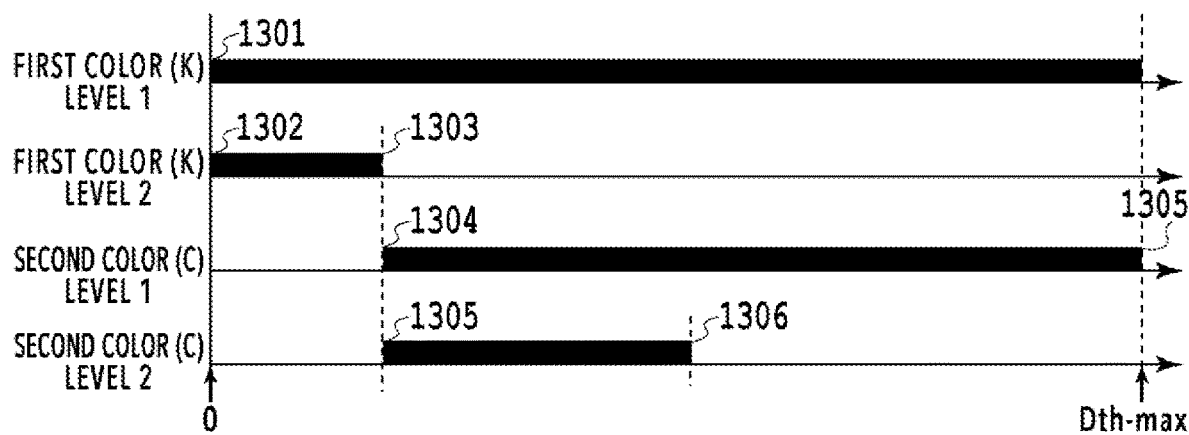
FIG. 13 is a graph illustrating a result of quantization processing in a third embodiment.

FIG. 13 illustrates a result of quantization in the case where the inter-color processing of the embodiment is performed for the first and second colors. FIG. 13 illustrates the case where the same gradation values InK and the same gradation values InC of the first and second colors greater than the maximum threshold Dth_max are uniformly inputted in a predetermined pixel region. In FIG. 13, a threshold region in which the first color is set to level 1, a threshold region in which the first color is set to level 2, a threshold region in which the second color is set to level 1, and a threshold region in which the second color is set to level 2 are illustrated by bold lines. The horizontal axis represents the range (0 to Dth_max) of values which the threshold Dth can take and corresponds to 0 to Dth_max for level 1 and to Dth_max+1 to 2×Dth_max for level 2.

Since the gradation value InK of the first color is greater than the maximum threshold Dth_max, the entire threshold region (0 to Dth_max) is quantized to level 1 or level 2. More specifically, in a threshold region (1302 to 1303), the first color is set to level 2 and two black dots (or a large black dot) are printed. Moreover, in a threshold region (1303 to Dth_max), the first color is set to level 1 and one black dot (or a small black dot) is printed.

Meanwhile, in a threshold region (1305 to 1306), the second color is set to level 2 and two cyan dots (or a large cyan dot) are printed. Moreover, in a threshold region (1306 to Dth_max), the second color is set to level 1 and one cyan dot (or small cyan dot) is printed.

This example corresponds to the case where the determination result is Yes in S1209 of FIG. 12 and the first offset value OfsC1 and the second offset value OfsC2 are set in S1210. Accordingly, the second color is set to level 1 or level 2 preferentially in the region where the first color is set to level 1.

As described above, in the embodiment, the threshold offset value for each level is adjusted while the inter-color processing is performed to avoid as much as possible occurrence of the case where the second color with low surface tension is printed in the same pixel region as the first color with high surface tension. Then, in the case where the printing in the same pixel region is performed, the second color is printed in a pixel region in which printing is performed with as little ink of the first color as possible. According to such an embodiment, it is possible to output an image with excellent coloring property while expressing a wider range of gray scale than that in the first embodiment.

OTHER EMBODIMENTS

In the inter-color processing described in the first to third embodiments, the threshold Dth is offset by using the calculated offset value Ofs to obtain the quantization threshold Dth', the obtained quantization threshold Dth' is compared with the gradation value In, and the quantized value Out is generated based on the magnitude relationship between the quantization threshold Dth' and the gradation value In. However, the calculated offset value Ofs may be used to offset the gradation value In instead of the threshold Dth. Specifically, the same result can be obtained by adding the calculated offset value Ofs to the gradation value In to obtain a new gradation value In' and comparing the new gradation value In' with the threshold Dth. In any case, it is only necessary to change the difference between the threshold Dth and the gradation value In based on the calculated offset value Ofs and compare the threshold Dth and the gradation value In in the relationship after the changing of the difference.

Although the quantization processing using the inter-color processing is described above, printing of the ink with high surface tension and the ink with low surface tension in the same pixel region can be minimized also in the case where, for example, an error diffusion method is employed as the quantization processing.

Specifically, first, the quantization processing for the first color with high surface tension is performed by performing normal error diffusion processing. Next, the quantization processing for the second color with low surface tension is performed. In this case, for a pixel for which the quantized value of the first color is already set to printing (1), the threshold is corrected to be set to a larger value. Then, in the case where the quantization processing for the third color is performed, for the pixel for which the quantized value of the first color is already set to printing (1), the threshold is corrected to an even larger value. This can reduce frequency of occurrence of the case where the quantized values of the first color and the third color are both set to printing (1) in the same pixel and suppress overlapping of the ink with high surface tension and the other ink with low surface tension on the print medium. However, in this example, since the quantization for the second color and beyond is performed based on the result of the quantization processing of the preceding color, the quantization processing cannot be performed in parallel for four colors as in the aforementioned embodiments.

In the aforementioned embodiment, description is given of the quantization processing performed to minimize overlapping of the first color with the other colors. However, in order to improve the resistance (robustness) of an image against misalignment of print positions between, for example, a black nozzle row and a color nozzle row, it is sometimes preferable that there are some pixels for which the quantized values of the first color and the other color are both set to printing (1). Favorable density and coloring property can be obtained for the first color even if such pixels are present as long as the number of pixels for which the quantized values of the other color are set to non-printing (0) is greater than the number of pixels for which the quantized values of the other color are set to printing (1) among pixels for which the quantized values of the first color are set to printing (1). In this case, the number of the pixels for which the quantized values of the first color and the other color are both set to printing (1) can be adjusted by adding a random number of a certain magnitude to the offset value Ofs. Adjusting the number of the pixels for which the quantized values of the first color and the other color are both set to printing (1) enables output of an image in which the balance between the coloring property and the robustness is favorably maintained.

Note that, although the serial inkjet printing apparatus is described above as an example by using FIGS. 1A and 1B, the present invention can be applied also to a full-line type inkjet printing apparatus.

Moreover, the used ink colors are not limited to the ink colors described in the aforementioned embodiments. For example, a light cyan ink and a light magenta ink with high lightness can be used in addition to the cyan ink and the magenta ink. Moreover, inks of particular colors such as red, green, and blue may be used.

Moreover, although the black pigment ink is described as the ink with high surface tension and the color dye inks are described as the inks with low surface tension in the above description, the surface tension of each ink does not necessarily depend on the type of the color material. A pigment ink with low surface tension and a dye ink with high surface tension can be produced. Moreover, only the black ink may have high surface tension with the inks of the aforementioned colors all being pigment inks. Such preparation can be performed by, for example, selecting a color material and a solvent based on physical properties such as refractive index and viscosity. In any case, an image with high density and excellent coloring property can be outputted as long as the quantization processing is performed such that the number of the pixels for which the quantized values for the ink with high surface tension and the ink with low surface tension are both set to printing (1) is minimized.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-077338 filed Apr. 15, 2019, which is hereby incorporated by reference wherein in its entirety.

What is claimed is:

1. An image processing method comprising:
   an obtaining step of obtaining a first gradation value for a first coloring material, a second gradation value for a second coloring material, and a third gradation value for a third coloring material for each pixel; and
   a generation step of, for each pixel, generating a first quantized value indicating applying or non-applying of the first coloring material by quantizing the first gradation value, generating a second quantized value indicating applying or non-applying of the second coloring material by quantizing the second gradation value, and generating a third quantized value indicating applying or non-applying of the third coloring material by quantizing the third gradation value,
   the image processing method including performing image processing for printing an image on a print medium by using an applying unit configured to apply the first coloring material according to the first quantized value, apply the second coloring material according to the second quantized value, and apply the third coloring material according to the third quantized value,
   wherein surface tension of the first coloring material is higher than surface tension of the second coloring material and the third coloring material, and
   wherein:
   in a case where the first gradation values obtained in the obtaining step for a plurality of pixels included in a predetermined pixel region are same, the second gradation values obtained in the obtaining step for the plurality of pixels are same, and the third gradation values obtained in the obtaining step for the plurality of pixels are same, and
   in the generation step, the first quantized values, the second quantized values, and the third quantized values are generated such that, in the predetermined pixel region, the number of pixels for each of which the first quantized value indicates applying the first coloring material, the second quantized value indicates non-applying the second coloring material and the third quantized value indicates non-applying the third coloring material is greater than the number of pixels for each of which the first quantized value indicates applying the first coloring material and at least the second quantized value indicates applying the second coloring material or the third quantized value indicates applying the third coloring material.

2. The image processing method according to claim 1, wherein, in the generation step, the first quantized value is generated by comparing the first gradation value with a first threshold stored in a threshold matrix, the second quantized value is generated by comparing the second gradation value with a second threshold obtained by correcting the first threshold based on the first gradation value, the third quantized value is generated by comparing the third gradation value with a third threshold obtained by correcting the first threshold based on the first gradation value and the second gradation value.

3. The image processing method according to claim 2, wherein, in the generation step, the second threshold is obtained by subtracting the first gradation value from the first threshold and the third threshold is obtained by subtracting the first gradation value and the second gradation value from the first threshold.

4. The image processing method according to claim 2, wherein
   in the obtaining step, a fourth gradation value for a fourth coloring material and a fifth gradation value for a fifth coloring material, which are different from the first coloring material, the second coloring material, and the third coloring material, are further obtained for each pixel, and in the generation step, a fourth quantized value indicating applying or non- applying of the fourth coloring material is generated by comparing the fourth gradation value with a fourth threshold stored in a second threshold matrix different from the threshold matrix and a fifth quantized value indicating applying or non-applying of the fifth coloring material is generated by comparing the fifth gradation value with a fifth threshold obtained by correcting the fourth threshold based on the fourth gradation value.

5. The image processing method according to claim 1, wherein in the generation step, the first quantized value is generated by comparing the first gradation value with a threshold stored in a threshold matrix, the second quantized value is generated by comparing a value obtained by correcting the second gradation value based on the first gradation value with the threshold, and the third quantized value is generated by comparing a value obtained by correcting the third gradation value based on the first gradation value and the second gradation value with the threshold.

6. The image processing method according to claim 2, wherein the threshold matrix has blue noise characteristics.

7. The image processing method according to claim 1, wherein
in the generation step,
the first quantized value is generated by quantizing the first gradation value, the second quantized value is generated by quantizing the second gradation value, and the third quantized value is generated by quantizing the third gradation value respectively by using error diffusion processing, and
a threshold to be used to quantize the second gradation value is corrected based on the first quantized value and a threshold to be used to quantize the third gradation value is corrected based on the first quantized value and the second quantized value.

8. An image processing method comprising
a generation step of generating a first quantized value by quantizing a first gradation value for a first coloring material, generating a second quantized value by quantizing a second gradation value for a second coloring material , and generating a third quantized value by quantizing a third gradation value for a third coloring material, for each pixel,
the image processing method including performing image processing for printing an image on a print medium by using an applying unit configured to apply the first coloring material according to the first quantized value, apply the second coloring material according to the second quantized value, and apply the third coloring material according to the third quantized value,
wherein surface tension of the first coloring material is higher than surface tension of the second coloring material and the third coloring material, and
wherein in the generation step,
the first quantized value is generated by comparing the first gradation value with a threshold for the pixel in a threshold matrix,
the second quantized value is generated based on the first gradation value, the second gradation value, and the threshold used in the comparison with the first gradation value and not based on the third gradation value,
in a case where a sum of the first gradation value and the second gradation value is smaller than a maximum value of thresholds arranged in the threshold matrix, at least one of the third gradation value or the threshold used in the comparison with the first gradation value is changed based on the first gradation value and the second gradation value and the third quantized value is generated based on a combination of the threshold and the third gradation value after the change, and
in a case where the sum of the first gradation value and the second gradation value is greater than the maximum value of the thresholds arranged in the threshold matrix, at least one of the third gradation value or the threshold used in the comparison with the first gradation value is changed based on the first gradation value and the third quantized value is generated based on a combination of the threshold and the third gradation value after the change.

9. The image processing method according to claim 8, wherein, in a case where, for a plurality of pixels included in a predetermined pixel region, the first gradation values are the same uniformly, the second gradation values are the same uniformly, and the third gradation values are the same uniformly, and
in the generation step, the second quantized values and the third quantized values are generated such that, in the predetermined pixel region, the number of pixels for each of which the first quantized value indicates applying the first coloring material, a the second quantized value indicates non-applying the second coloring material and the third quantized value indicates non-applying the third coloring material is greater than the number of pixels for each of which the first quantized value indicates applying the first coloring material and at least the second quantized value indicates applying the second coloring material or the third quantized value indicates applying the third coloring material.

10. An image processing method comprising:
a generation step of generating a first quantized value by quantizing a first gradation value for a first coloring material, generating a second quantized value by quantizing a second gradation value for a second coloring material, and generating a third quantized value by quantizing a third gradation value for a third coloring material, for each pixel,
the image processing method including performing image processing for printing an image on a print medium by using an applying unit configured to apply the first coloring material according to the first quantized value, apply the second coloring material according to the second quantized value, and apply the third coloring material according to the third quantized value,
wherein surface tension of the first coloring material is higher than surface tension of the second coloring material and the third coloring material, and
wherein in the generation step,
the first quantized value is generated by comparing the first gradation value with a threshold for the pixel in a threshold matrix,
the second quantized value is generated based on the first gradation value, the second gradation value, and the threshold used in the comparison with the first gradation value and not based on the third gradation value,
in a case where a sum of the first gradation value and the second gradation value is smaller than a maximum value of thresholds arranged in the threshold matrix, the third quantized value is generated by comparing the third gradation value with a value obtained by subtracting the first gradation value and the second gradation value from the threshold used in the comparison with the first gradation value, and in a case where the sum of the first gradation value and the second gradation value is greater than the maximum value of the thresholds arranged in the threshold matrix, the third quantized value is generated by comparing the third gradation value with a value obtained by subtracting the first gradation value from the threshold used in the comparison with the first gradation value.

11. The image processing method according to claim 10, wherein in the generation step, in a case where the value obtained by subtracting the first gradation value and the second gradation value from the threshold used in the comparison with the first gradation value is a negative value, the third gradation value is compared with a value obtained by adding the maximum value of the thresholds arranged in the threshold matrix to the value obtained by subtracting the first gradation value and the second gradation value from the threshold, and in a case where the value obtained by subtracting the first gradation value from the threshold used in the comparison with the first gradation value is a negative value, the third gradation value is compared with a value obtained by adding the maximum value of the thresholds arranged in the threshold matrix to the value obtained by subtracting the first gradation value from the threshold.

12. The image processing method according to claim 8, wherein in a case where a sum of the first gradation value and the second gradation value is smaller than a maximum value of thresholds arranged in the threshold matrix, a sum of the first gradation value, the second gradation value, and a third gradation value is greater than the maximum value of the thresholds arranged in the threshold matrix, and in a case where the sum of the first gradation value and the second gradation value is greater than the maximum value of the thresholds arranged in the threshold matrix, a sum of the first gradation value and the third gradation value is greater than the maximum value of the thresholds arranged in the threshold matrix.

13. The image processing method according to claim 8, wherein, in the gradation step, for each pixel, a fourth gradation value for a fourth coloring material is quantized by comparing the fourth gradation value with a threshold for the pixel in a second threshold matrix different from the threshold matrix to generate a fourth quantized value and a fifth quantized value is generated based on the fourth gradation value, a fifth gradation value for a fifth coloring material, and the threshold used in the comparison with the fourth gradation value.

14. The image processing method according to claim 8, wherein the threshold matrix has blue noise characteristics.

15. The image processing method according to claim 1, wherein the first coloring material is black ink, the second coloring material is cyan ink, and the third coloring material is magenta ink.

16. The image processing method according to claim 1, wherein the first coloring material and the third coloring material are pigment inks and the second coloring material is a dye ink.

17. An image processing method comprising:

an obtaining step of obtaining a first gradation value for a first coloring material and a second gradation value for a second coloring material for each pixel; and a generation step of quantizing the first gradation value to generate a first quantized value at any of a certain number of levels that is smaller than the number of levels for the first gradation value and quantizing the second gradation value to generate a second quantized value at any of a certain number of levels that is smaller than the number of levels for the second gradation value, for each pixel, the image processing method including performing image processing for printing an image on a print medium by using an applying unit configured to apply the first coloring material according to the first quantized value such that the higher the level of the first quantized value is, the greater an amount of the first coloring material to be applied is and apply the second coloring material according to the second quantized value such that the higher the level of the second quantized value is, the greater an amount of the second coloring material to be applied is, wherein surface tension of the first coloring material is higher than surface tension of the second coloring material, and wherein in a case where the first gradation values obtained in the obtaining step for a plurality of pixels included in a predetermined pixel region are same, and the second gradation values obtained in the obtaining step for the plurality of pixels are same, in the generation step, the first quantized values and the second quantized values are generated such that, in the predetermined pixel region, pixels with a lower level of the first quantized values include more pixels for which the level of the second quantized value is not 0.

18. An image processing method comprising a generation step of quantizing a first gradation value for a first coloring material to generate a first quantized value at any of a certain number of levels that is smaller than the number of levels for the first gradation value and quantizing a second gradation value for a second coloring material to generate a second quantized value at any of a certain number of levels that is smaller than the number of levels for the second gradation value, for each pixel, the image processing method including performing image processing for printing an image on a print medium by using an applying unit configured to apply the first coloring material according to the first quantized value such that the higher the level of the first quantized value is, the greater an amount of the first coloring material to be applied is and apply the second coloring material according to the second quantized value such that the higher the level of the second quantized value is, the greater an amount of the second coloring material to be applied is, wherein surface tension of the first coloring material is higher than surface tension of the second coloring material, and wherein in the generation step, the first gradation value is quantized to generate the first quantized value by deriving a corrected threshold, having a greater value than a threshold for the pixel in a threshold matrix, based on the threshold and comparing the first gradation value with the threshold and the corrected threshold, a first difference which is a difference between the second gradation value and the threshold used in the comparison with the first gradation value is changed based on the first gradation value, a second difference which is a difference between the second gradation value and the corrected threshold used in the comparison with the first gradation value is changed based on the first gradation value, and the second gradation value is quantized based on relationships of the second gradation value with the threshold and the corrected threshold after the change, in a case where the same first gradation values and the same second gradation values are uniformly given to a plurality of pixels included in a predetermined pixel region, in the gradation step, the first difference and the second difference are changed such that, in the predetermined pixel region, pixels with a lower level of the first quantized values include more pixels for which the level of the second quantized value is not 0.

19. The image processing method according to claim 17, wherein the first coloring material is black ink, the second coloring material is color ink.

20. The image processing method according to claim 17, wherein the first coloring material is a pigment ink and the second coloring material is a dye ink.

21. The image processing method according to claim 1 further comprising the applying step using the applying unit.

22. An image processing method comprising
a generation step of generating a first quantized value by quantizing a first gradation value for a first coloring material, generating a second quantized value by quantizing a second gradation value for a second coloring material, and generating a third quantized value by quantizing a third gradation value for a third coloring material, for each pixel, the image processing method including performing image processing for printing an image on a print medium by using an applying unit configured to apply the first coloring material according to the first quantized value, apply the second coloring material according to the second quantized value, and apply the third coloring material according to the third quantized value, wherein surface tension of the first coloring material is higher than surface tension of the second coloring material and the third coloring material, and wherein in the generation step, in a case where a sum of the first gradation value that is obtained, the second gradation value that is obtained and the third gradation value that is obtained is larger than a maximum value of thresholds arranged in a matrix, in a first step, the first quantized value is generated by comparing the first gradation value with a threshold for the pixel in the matrix, in a second step, the second quantized value is generated based on the first gradation value, the second gradation value, and the threshold in the matrix, such that a value indicating applying the second material is generated preferentially to a pixel for which a value indicating non-applying the first material is generated over to a pixel for which a value indicating applying the first material is generated, and in a third step, the third quantized value is generated based on the first gradation value, the third gradation value, and the threshold in the matrix, such that a value indicating applying the third material is generated preferentially to a pixel for which a value indicating applying the second material is generated and a value indicating non-applying the first material is generated over to a pixel for which a value indicating applying the first material is generated and a value indicating non-applying the second material is generated.

23. The image processing method according to claim 22, wherein
in the second step, at least one of the second gradation value or the threshold in the matrix is changed based on the first gradation value, and then the second quantized value is generated based on the second gradation value and the threshold in the matrix after the change, and
in the third step, at least one of the third gradation value or the threshold in the matrix is changed based on the first gradation value, and then the third quantized value is generated based on the third gradation value and the threshold in the matrix after the change.

24. The image processing method according to claim 23, wherein
in the second step, the change is performed so as to substrate the first gradation value from the threshold in the matrix and
in the third step, the change is performed so as to substrate the first gradation value from the threshold in the matrix.

25. The image processing method according to claim 23, wherein
in the second step, the change is performed so as to add the first gradation value to the second gradation value and
in the third step, the change is performed so as to add the first gradation value to the third gradation value.

* * * * *